US012749223B2

(12) United States Patent
Cao et al.

(10) Patent No.: US 12,749,223 B2
(45) Date of Patent: Sep. 29, 2026

(54) APPARATUS AND METHOD FOR DECODING THREE-DIMENSIONAL (3D) MAP, AND ENCODED BITSTREAM OF 3D MAP

(71) Applicant: HUAWEI TECHNOLOGIES CO., LTD., Shenzhen (CN)

(72) Inventors: Xiaoran Cao, Hangzhou (CN); Kangying Cai, Beijing (CN); Pei Wang, Beijing (CN); Chenxi Tu, Shenzhen (CN); Qi Su, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 100 days.

(21) Appl. No.: 18/526,677

(22) Filed: Dec. 1, 2023

(65) Prior Publication Data

US 2024/0119639 A1 Apr. 11, 2024

Related U.S. Application Data

(63) Continuation of application No. PCT/CN2021/098483, filed on Jun. 4, 2021.

(51) Int. Cl.
*G06T 9/00* (2006.01)
*G06T 17/05* (2011.01)

(52) U.S. Cl.
CPC ................ *G06T 9/00* (2013.01); *G06T 17/05* (2013.01)

(58) Field of Classification Search
CPC ..... G06T 9/00; G06T 17/05; G06T 2211/416; G06V 20/56; G06V 10/46; H04N 19/124
See application file for complete search history.

(56) References Cited

U.S. PATENT DOCUMENTS

2010/0166055 A1* 7/2010 Schmit ................. H04N 19/124 375/E7.076
2021/0012538 A1* 1/2021 Wang ...................... G06T 9/004

FOREIGN PATENT DOCUMENTS

CN 102168983 A 8/2011
CN 110869981 A 3/2020
(Continued)

OTHER PUBLICATIONS

Takacs et al., "Outdoors augmented reality on mobile phone using loxel-based visual feature organization," Proceedings of the workshop on multimedia information retrieval (MIRO) XX, Vancouver, B.C, Canada, XP058201597, Total 8 pages (Oct. 30, 2008).
(Continued)

*Primary Examiner* — Said Broome
*Assistant Examiner* — Denis Vasiliy Minko
(74) *Attorney, Agent, or Firm* — Leydig, Voit & Mayer, Ltd.

(57) ABSTRACT

An apparatus and a method for decoding a 3D map, and an encoded bitstream of a 3D map are provided. The apparatus for decoding a 3D map includes a transmitter and a decompressor. The transmitter is configured to receive a bitstream of a 3D map, where the 3D map includes a plurality of 3D map points. The decompressor is configured to decompress the bitstream of the 3D map to obtain reconstructed data of the 3D map, where the reconstructed data of the 3D map includes reconstructed data of the plurality of 3D map points. In this application, the decompressor end may support decompression of compressed data of the 3D map, to support compression/decompression of data of the 3D map.

25 Claims, 19 Drawing Sheets

(56) References Cited

FOREIGN PATENT DOCUMENTS

| | | | | | |
|---|---|---|---|---|---|
| CN | 112235568 | A | | 1/2021 | |
| KR | 20200096411 | A | * | 8/2020 | ............. G06N 3/044 |
| WO | 2019198636 | A1 | | 10/2019 | |
| WO | 2020005364 | A1 | | 1/2020 | |

OTHER PUBLICATIONS

Ascenso et al., "Lossless compression of binary image descriptors for visual sensor networks," 18th International Conference on Digital Signal Processing (DSP), XP032498453, Total 8 pages, IEEE Institute of Electrical and Electronics Engineers, New York, New York (Jul. 1, 2013).

Tsai et al., "Location coding for mobile image retrieval," Proceedings of the 5th International Mobile Multimedia Communications Conference, XP055026047, Total 7 pages (Jan. 1, 2009).

Ding et al., "Compression for the feature points with binary descriptors," Proceedings of the 19th International Conference on Digital Signal Processing, XP032644119, Total 6 pages, IEEE Institute of Electrical and Electronics Engineers, New York, New York (Aug. 20, 2014).

* cited by examiner

APPARATUS AND METHOD FOR DECODING THREE-DIMENSIONAL (3D) MAP, AND ENCODED BITSTREAM OF 3D MAP

CROSS-REFERENCE TO RELATED APPLICATIONS

This application is a continuation of International Application No. PCT/CN2021/098483, filed on Jun. 4, 2021, the disclosure of which is hereby incorporated by reference in its entirety.

TECHNICAL FIELD

This application relates to three-dimensional (3D) map technologies, and in particular, to an apparatus and a method for decoding a 3D map, and an encoded bitstream of a 3D map.

BACKGROUND

Virtual reality (VR), augmented reality (AR) and mixed reality (MR) are multimedia virtual scene technologies emerging in recent years. Such technologies can be used to create virtual reality and overlay it with a real world to produce a new visual environment and interactive experience. In such an application, an electronic device needs to determine pose information of the electronic device in a current environment, to accurately implement fusion between a virtual object and a real scene.

In addition, in applications such as autonomous driving, autonomous navigation, uncrewed aerial vehicle automatic inspection, and industrial robots, a carrying device such as a vehicle, an uncrewed aerial vehicle, or a robot needs to determine a pose of an electronic device carried by the carrying device, to determine a pose of the carrying device in a current environment, so as to perform accurate route planning, navigation, detection, and control.

In the foregoing applications, for a problem that the pose of the electronic device in the current environment needs to be determined, a typical solution is as follows: The electronic device receives, from a server or another device, a 3D map of an environment in which the electronic device is located, collects visual information in the environment by using a local sensor, and determines the current pose of the electronic device based on the collected visual information and the downloaded 3D map.

However, an original 3D map usually includes a large data volume, and map transmission needs to consume a large amount of bandwidth and time, which severely limits application performance and affects user experience.

SUMMARY

This application provides an apparatus and a method for decoding a 3D map, and an encoded bitstream of a 3D map, to reduce a data volume of a 3D map, thereby reducing transmission bandwidth and improving transmission efficiency.

According to a first aspect, this application provides a codec system for a 3D map, including: an encoding apparatus and a decoding apparatus. The encoding apparatus is communicatively connected to the decoding apparatus. The encoding apparatus is configured to: compress data of a 3D map to obtain a bitstream of the 3D map, and send the bitstream of the 3D map to the decoding apparatus, where the 3D map includes a plurality of 3D map points, and the data of the 3D map includes data of the plurality of 3D map points. The decoding apparatus is configured to: receive the bitstream of the 3D map, and decompress the bitstream of the 3D map to obtain the data of the 3D map.

The 3D map may include the plurality of 3D map points, and correspondingly, the data of the 3D map may include the data of the plurality of 3D map points. The 3D map point is a point of interest or a point having a significant feature in an environment.

In this embodiment of this application, a compression module may compress the data of the 3D map, to reduce a data volume of the 3D map, for example, to reduce the data volume of the 3D map from a terabyte (TB) level to a gigabyte (GB) level. Therefore, in a scenario in which a 3D map needs to be transmitted, transmitting compressed data of the 3D map instead of transmitting original data of the 3D map can reduce a data volume for transmission, and can further reduce bandwidth occupied by the transmission, thereby improving transmission efficiency of the 3D map.

In a possible implementation, the encoding apparatus is a cloud server, and the decoding apparatus is an electronic device; or the encoding apparatus is a first electronic device, and the decoding apparatus is a second electronic device. The decoding apparatus is further configured to send a 3D map download request to the decoding apparatus, where the 3D map download request includes location indication information. The encoding apparatus is further configured to: receive the 3D map download request, and send, to the decoding apparatus according to the 3D map download request, a bitstream that is of the 3D map and that corresponds to the location indication information.

The foregoing electronic device may be a user terminal device.

In a possible implementation, the encoding apparatus is an electronic device, and the decoding apparatus is a cloud server. The encoding device is configured to: after the 3D map is created, send the bitstream of the 3D map to the decoding apparatus.

Optionally, in this embodiment of this application, the electronic device may collect visual information by using a sensor, and determine a current pose of the electronic device with reference to the visual information and a 3D map from a server.

The 3D map is provided by the server. To be specific, the server creates the 3D map, then compresses the 3D map, and transmits compressed data of the 3D map to the electronic device. After receiving the compressed data of the 3D map, the electronic device performs decompression to obtain reconstructed data of the 3D map, and determines the current pose of the electronic device with reference to the collected visual information and the 3D map. The pose is location and orientation information of the electronic device, and may be an absolute pose in the world coordinate system, or may be a relative pose relative to a point in an environment.

In this embodiment of this application, the server may create the 3D map in advance, compress the 3D map, and then store compressed data of the 3D map locally. In this way, storage space can be saved. In addition, the server may transmit the compressed data of the 3D map to another device, for example, a cloud storage.

1. The server creates the 3D map, compresses the 3D map to obtain compressed data of the 3D map, and stores the compressed data locally.

The server compresses the 3D map, to save local storage space.

2. The electronic device sends a map download request to the server. The map download request is triggered in two manners:

(1) A user starts a 3D map application installed on the electronic device, and the application uploads, to a server corresponding to the application, location information obtained based on GPS positioning or Wi-Fi positioning. The upload operation may trigger a map download request. Because uploaded content includes the location information, the server may perform preliminary estimation based on the location information, and transmit, to the electronic device, compressed data of a 3D map of an area to which a positioning point indicated by the location information belongs. A range of the area to which the positioning point indicated by the location information belongs may be preset. For example, the area to which the positioning point belongs may be an administrative region (including a county, a city, a country, or an administrative region) at any level in which the positioning point is located, or may be a circular area centered on the positioning point and using a specified distance as a radius.

(2) The user starts a 3D map application installed on the electronic device, and actively enters or selects an area on the application. For example, the user actively enters "xx business center", or selects "street A" from a list of "street A, street B, and street C". The foregoing operations of the user may trigger a map download request. Regardless of whether the user enters or selects a geographical location, the server accordingly transmits compressed data of a 3D map of the geographical location to the electronic device.

It should be understood that, in this embodiment of this application, in addition to the foregoing two manners, another manner may be used for triggering a map download request. For example, the electronic device automatically detects whether a condition for downloading a 3D map or starting downloading a 3D map is satisfied, or the electronic device starts downloading a 3D map upon detecting an ambient light change or an environment change, to request downloading of a 3D map of an area range from the server. A size of the area range is not specifically limited.

3. The server sends the compressed data of the 3D map to the electronic device.
4. The electronic device collects the visual information.

It should be noted that step 3 and step 4 are independent of each other, and a sequence is not limited.

5. The electronic device decompresses the compressed data of the 3D map to obtain the reconstructed data of the 3D map.
6. The electronic device performs positioning in the 3D map based on the visual information, to obtain a pose corresponding to the visual information.

After receiving the compressed data of the 3D map, the electronic device does not need to immediately decompress the compressed data, and needs to decompress the compressed data to obtain the reconstructed data of the 3D map only before performing positioning based on the visual information. For example, the user may pre-download compressed data of a 3D map of an area range by downloading an "offline map", and decompress the compressed data of the 3D map only when positioning is required.

Optionally, in this embodiment of this application, the electronic device may collect visual information by using a sensor, and a server determines a current pose of the electronic device with reference to the visual information from the electronic device and a 3D map.

The 3D map is provided by the server. To be specific, the server creates the 3D map, then compresses the 3D map, and stores compressed data of the 3D map locally. When receiving the visual information from the electronic device, the server performs decompression to obtain reconstructed data of the 3D map, and determines the current pose of the electronic device with reference to the visual information and the 3D map.

1. The server creates the 3D map, compresses the 3D map to obtain compressed data of the 3D map, and stores the compressed data locally.
2. The electronic device collects the visual information.
3. The electronic device sends the visual information to the server.
4. The server decompresses the compressed data of the 3D map to obtain the reconstructed data of the 3D map.

It should be understood that the server compresses the 3D map to save storage space.

5. The server performs positioning in the 3D map based on the visual information, to obtain a pose corresponding to the visual information.
6. The server sends the pose to the electronic device.

Optionally, in this embodiment of this application, the electronic device may collect visual information by using a sensor, and determine a current pose of the electronic device with reference to the visual information and a 3D map.

The 3D map is provided by the electronic device. To be specific, the electronic device creates the 3D map, then compresses the 3D map, and stores compressed data of the 3D map locally. When the visual information is collected, the electronic device performs decompression to obtain reconstructed data of the 3D map, and determines the current pose of the electronic device with reference to the collected visual information and the 3D map.

1. The electronic device creates the 3D map, compresses the 3D map to obtain compressed data of the 3D map, and stores the compressed data locally.

It should be understood that the electronic device compresses the 3D map to save storage space.

2. The electronic device collects the visual information by using the sensor.
3. The electronic device decompresses the compressed data of the 3D map to obtain the reconstructed data of the 3D map.
4. The electronic device performs positioning in the 3D map based on the visual information, to obtain a pose corresponding to the visual information.

Optionally, in this embodiment of this application, the second electronic device may collect visual information by using a sensor, and determine a current pose of the second electronic device with reference to the visual information and a 3D map from a server.

The 3D map is created by the first electronic device. To be specific, the first electronic device creates the 3D map, compresses the 3D map, and then sends compressed data of the 3D map to the server. The server then sends the compressed data of the 3D map to the second electronic device. The second electronic device performs decompression to obtain reconstructed data of the 3D map, and determines the current pose of the second electronic device with reference to the collected visual information and the 3D map.

In this embodiment of this application, the first electronic device may create the 3D map in advance, compress the 3D map, and then transmit the compressed data of the 3D map to the server. In this way, transmission bandwidth can be reduced.

1. The first electronic device creates the 3D map, compresses the 3D map to obtain the compressed data of the 3D map.
2. The first electronic device sends the compressed data of the 3D map to the server.

The first electronic device compresses the 3D map and then transmits the compressed data of the 3D map, to reduce transmission bandwidth, and improve transmission efficiency.

3. The second electronic device sends a map download request to the server.

The second electronic device may send the map download request based on a trigger manner shown in FIG. 4*a*.

4. The server sends the compressed data of the 3D map to the second electronic device.
5. The second electronic device decompresses the compressed data of the 3D map to obtain the reconstructed data of the 3D map.
6. The second electronic device collects the visual information by using the sensor.
7. The second electronic device performs positioning in the 3D map based on the visual information, to obtain a pose corresponding to the visual information.

Optionally, in this embodiment of this application, the second electronic device may collect visual information by using a sensor, and a server determines a current pose of the second electronic device with reference to the visual information from the second electronic device and a 3D map from the first electronic device.

The 3D map is created by the first electronic device. To be specific, the first electronic device creates the 3D map, compresses the 3D map, and then sends compressed data of the 3D map to the server. The server performs decompression to obtain reconstructed data of the 3D map, and determines the current pose of the second electronic device with reference to the visual information from the second electronic device and the 3D map.

1. The first electronic device creates the 3D map, compresses the 3D map to obtain the compressed data of the 3D map.
2. The first electronic device sends the compressed data of the 3D map to the server.
3. The second electronic device collects the visual information by using the sensor.
4. The second electronic device sends a positioning request to the server, where the positioning request carries the visual information.
5. The server decompresses the compressed data of the 3D map to obtain the reconstructed data of the 3D map.
6. The server performs positioning in the 3D map based on the visual information, to obtain a pose corresponding to the visual information.
7. The server sends, to the second electronic device, the pose obtained through positioning.

Optionally, in this embodiment of this application, the second electronic device may collect visual information by using a sensor, and determine a current pose of the second electronic device with reference to the visual information and a 3D map from the first electronic device.

The 3D map is created by the first electronic device. To be specific, the first electronic device creates the 3D map, compresses the 3D map, and then sends compressed data of the 3D map to the second electronic device. The second electronic device performs decompression to obtain reconstructed data of the 3D map, and determines the current pose of the second electronic device with reference to the collected visual information and the 3D map from the first electronic device.

1. The first electronic device creates the 3D map, compresses the 3D map to obtain compressed data of the 3D map, and stores the compressed data locally.
2. The second electronic device sends a map download request to the first electronic device.
3. The first electronic device sends the compressed data of the 3D map to the second electronic device.
4. The second electronic device decompresses the compressed data of the 3D map to obtain the reconstructed data of the 3D map.
5. The second electronic device collects the visual information by using the sensor.
6. The second electronic device performs positioning in the 3D map based on the visual information, to obtain a pose corresponding to the visual information.

In a possible implementation, the data of the 3D map further includes a plurality of area descriptors, and any one of the plurality of area descriptors describes features of a part of or all 3D map points of the plurality of 3D map points.

For any one of the plurality of area descriptors, the area descriptor may describe features of a part of or all 3D map points of the plurality of 3D map points. In this case, the area descriptor and the 3D map point are in a one-to-many relationship. A feature of each of the plurality of 3D map points may be described by a part of or all area descriptors of the plurality of area descriptors. In this case, the 3D map point and the area descriptor are in a one-to-many relationship. It can be learned that a plurality of area descriptors and a plurality of 3D map points are in a many-to-many relationship. A method for generating an area descriptor includes but is not limited to a conventional method such as a bag of words (BOW) and a vector of locally aggregated descriptor (VLAD), and a novel method based on NetVLAD or artificial intelligence (AI). Similarly, a plurality of area descriptors may be identified by numbers to distinguish between the plurality of area descriptors. Similarly, however, the numbers are not intended to limit a sequence of the plurality of area descriptors.

In a possible implementation, data of any one of the plurality of 3D map points includes a 3D map point descriptor and a 3D map point spatial location.

The 3D map point descriptor is a vector, used to represent a local feature of a 3D map point.

The 3D map point spatial location may be represented by using X, Y, and Z on three-dimensional spatial axes, or may be represented by using a longitude, a latitude, and an altitude, or may be represented by using polar coordinates or the like. A method for representing a 3D map point spatial location is not specifically limited in embodiments of this application. A 3D map point spatial location may be an absolute location of a 3D map point or a relative location of a 3D map point.

In a possible implementation, the encoding apparatus is further configured to create the 3D map.

In a possible implementation, the decoding apparatus is further configured to perform positioning based on the 3D map.

According to a second aspect, this application provides an apparatus for decoding a 3D map, including a transmission module and a decompression module. The transmission module is configured to receive a bitstream of a 3D map, where the 3D map includes a plurality of 3D map points. The decompression module is configured to decompress the bitstream of the 3D map to obtain reconstructed data of the 3D map, where the reconstructed data of the 3D map includes reconstructed data of the plurality of 3D map points.

In this embodiment of this application, the decompression module may support decompression of compressed data of the 3D map. In other words, an encoding and decoding system may support compression/decompression of data of the 3D map, to reduce a data volume of the 3D map. In a scenario in which a 3D map needs to be transmitted, transmitting compressed data of the 3D map instead of transmitting original data of the 3D map can reduce a data volume for transmission, and can further reduce bandwidth occupied by the transmission, thereby improving transmission efficiency of the 3D map.

In this embodiment of this application, the decompression may include at least one of dequantization and prediction.

Quantization means mapping to-be-processed data to one or more quantization indexes, where each quantization index corresponds to one quantization center. A quantity of bits of the quantization index is usually obviously less than a quantity of bits of original data, to save storage or transmission bandwidth. Quantization methods include but are not limited to scalar quantization, vector quantization, product quantization, and the like. Based on this, dequantization is the reverse of the foregoing quantization. To be specific, reconstructed data corresponding to the original data is restored based on the one or more quantization indexes, and a quantity of bits of the reconstructed data is greater than the quantity of bits of the quantization index.

Prediction means performing prediction by using processed data and residual data of the to-be-processed data, to obtain the to-be-processed data. Selection of reference data may be pre-agreed. For example, previously processed data is fixedly used as the reference data, and in this case, the reference data does not need to be identified in the bitstream. For another example, any processed data is used, and in this case, identification information of the reference data needs to be written into the bitstream, and includes a number of the reference data, or other information that can be used to infer the reference data.

In the foregoing description of the data of the 3D map, it can be learned that a sequence of the plurality of 3D map points included in the 3D map is meaningless. Therefore, if a decoder end is related to decompression or decoding of the 3D map point, the sequence of the plurality of 3D map points is not limited. Decompression or decoding may be performed on the plurality of 3D map points based on a sequence of the bitstream.

In addition, on an encoder end, processing of the data of the 3D map includes encapsulation, to encapsulate to-be-encoded data into a bitstream. The encapsulation may use any encoding algorithm, for example, entropy encoding. Entropy encoding is a lossless data compression method. Entropy encoding algorithms include but are not limited to: Huffman (huffman) encoding, arithmetic encoding, a compression/decompression algorithm improved based on an LZ77 compression algorithm (lempel-ziv-markov chain-algorithm, LZMA), a function library algorithm for data compression (zlib), and the like. Correspondingly, on the decoder end, the decompression may further include decapsulation, to decapsulate the bitstream into to-be-decompressed data. The decapsulation may use a decoding algorithm corresponding to an encoding algorithm used by the encoder end, for example, entropy decoding.

In a possible implementation, the data of the 3D map further includes reconstructed data of a plurality of area descriptors, and any one of the plurality of area descriptors describes features of a part of or all 3D map points of the plurality of 3D map points.

In a possible implementation, reconstructed data of any one of the plurality of 3D map points includes reconstructed data of a 3D map point descriptor and reconstructed data of a 3D map point spatial location.

In a possible implementation, the apparatus for decoding a 3D map is a cloud server or an electronic device. The transmission module is further configured to: send a 3D map download request, where the 3D map download request includes location indication information; and receive a bitstream that is of the 3D map and that corresponds to the location indication information.

In a possible implementation, the apparatus for decoding a 3D map is a cloud server. The transmission module is configured to receive the bitstream of the 3D map created by an electronic device.

A plurality of implementations of the decompression module are as follows:

In a possible implementation, the decompression module includes a decapsulation module, and a prediction module and/or a dequantization module. The decapsulation module is configured to process an input bitstream of the 3D map to output first data. The prediction module is configured to perform prediction on input residual data of second data to output the second data. The dequantization module is configured to perform dequantization on input third data to output dequantized data of the third data. The first data is the residual data of the second data or the third data, the second data is the reconstructed data of the 3D map or the third data, and the dequantized data of the third data is the reconstructed data of the 3D map.

Optionally, the decompression module includes only the decapsulation module and the dequantization module or the prediction module.

Optionally, the decompression module includes the prediction module, the dequantization module, and the encapsulation module.

In a possible implementation, the prediction module includes a first prediction module and a second prediction module; and/or the dequantization module includes a first dequantization module and a second dequantization module. The first prediction module is configured to perform prediction on input residual data of fourth data to output the fourth data. The first dequantization module is configured to perform dequantization on input fifth data to output dequantized data of the fifth data. The fourth data is reconstructed data of one of the plurality of area descriptors or the fifth data, and the dequantized data of the fifth data is reconstructed data of one of the plurality of area descriptors. The second prediction module is configured to perform prediction on input residual data of sixth data to output the sixth data. The second dequantization module is configured to perform dequantization on input seventh data to output dequantized data of the seventh data. The sixth data is reconstructed data of one of the plurality of 3D map points or the seventh data, and the dequantized data of the seventh data is reconstructed data of one of the plurality of 3D map points.

Optionally, the decompression module includes only the first prediction module and the second prediction module, or includes only the first dequantization module and the second dequantization module.

Optionally, the decompression module includes the first prediction module, the second prediction module, the first dequantization module, and the second dequantization module.

In a possible implementation, the prediction module includes a first prediction module, a second prediction module, and a third prediction module; and/or the dequantization module includes a first dequantization module, a second dequantization module, and a third dequantization module. The first prediction module is configured to perform prediction on input residual data of eighth data to output the eighth data. The first dequantization module is configured to perform dequantization on input ninth data to output dequantized data of the ninth data. The eighth data is reconstructed data of one of the plurality of area descriptors or the ninth data, and the dequantized data of the ninth data is reconstructed data of one of the plurality of area descriptors. The second prediction module is configured to perform prediction on input residual data of tenth data to output the tenth data. The second dequantization module is configured to perform dequantization on input eleventh data to output dequantized data of the eleventh data. The tenth data is reconstructed data of a 3D map point descriptor of one of the plurality of 3D map points or the eleventh data, and the dequantized data of the eleventh data is reconstructed data of a 3D map point descriptor of one of the plurality of 3D map points. The third prediction module is configured to perform prediction on input residual data of twelfth data to output the twelfth data. The third dequantization module is configured to perform dequantization on input thirteenth data to output dequantized data of the thirteenth data. The twelfth data is reconstructed data of a 3D map point spatial location of one of the plurality of 3D map points or the thirteenth data, and the dequantized data of the thirteenth data is reconstructed data of a 3D map point spatial location of one of the plurality of 3D map points.

Optionally, the decompression module includes only the first prediction module, the second prediction module, and the third prediction module, or includes only the first dequantization module, the second dequantization module, and the third dequantization module.

Optionally, the decompression module includes the first prediction module, the second prediction module, the third prediction module, the first dequantization module, the second dequantization module, and the third dequantization module.

In a possible implementation, the decompression module includes a first decompression submodule and a second decompression submodule. The first decompression submodule is configured to decompress an input bitstream of fourteenth data to output the fourteenth data. The second decompression submodule is configured to compress an input bitstream of fifteenth data to output the fifteenth data. The fourteenth data is reconstructed data of one of the plurality of area descriptors, and the fifteenth data is reconstructed data of one of the plurality of 3D map points.

In a possible implementation, the first decompression submodule includes a first decapsulation module, and a first prediction module and/or a first dequantization module. The second decompression submodule includes a second decapsulation module, and a second prediction module and/or a second dequantization module. The first decapsulation module is configured to process an input bitstream of the 3D map to output sixteenth data. The first prediction module is configured to perform prediction on input residual data of seventeenth data to output the seventeenth data. The first dequantization module is configured to perform dequantization on input eighteenth data to output dequantized data of the eighteenth data. The sixteenth data is the residual data of the seventeenth data or the eighteenth data, the seventeenth data is reconstructed data of one of the plurality of area descriptors or the eighteenth data, and the dequantized data of the eighteenth data is reconstructed data of one of the plurality of area descriptors. The second decapsulation module is configured to process an input bitstream of the 3D map to output nineteenth data. The second prediction module is configured to perform prediction on input residual data of twentieth data to output the twentieth data. The second dequantization module is configured to perform dequantization on input twenty-first data to output dequantized data of the twenty-first data. The nineteenth data is the residual data of the twentieth data or the twenty-first data, the twentieth data is reconstructed data of one of the plurality of 3D map points or the twenty-first data, and the dequantized data of the twenty-first data is reconstructed data of one of the plurality of 3D map points.

In a possible implementation, the decompression module includes a first decompression submodule, a second decompression submodule, and a third decompression submodule. The first decompression submodule is configured to decompress an input bitstream of twenty-second data to output the twenty-second data. The second decompression submodule is configured to compress an input bitstream of twenty-third data to output the twenty-third data. The third decompression submodule is configured to decompress an input bitstream of twenty-fourth data to output the twenty-fourth data. The twenty-second data is reconstructed data of one of the plurality of area descriptors, the twenty-third data is reconstructed data of a 3D map point descriptor of one of the plurality of 3D map points, and the twenty-fourth data is reconstructed data of a 3D map point spatial location of one of the plurality of 3D map points.

In a possible implementation, the first decompression submodule includes a first decapsulation module, and a first prediction module and/or a first dequantization module. The second decompression submodule includes a second decapsulation module, and a second prediction module and/or a second dequantization module. The third decompression submodule includes a third decapsulation module, and a third prediction module and/or a third dequantization module. The first decapsulation module is configured to process an input bitstream of the 3D map to output twenty-fifth data. The first prediction module is configured to perform prediction on input residual data of twenty-sixth data to output the twenty-sixth data. The first dequantization module is configured to perform dequantization on input twenty-seventh data to output dequantized data of the twenty-seventh data. The twenty-fifth data is the residual data of the twenty-sixth data or the twenty-seventh data, the twenty-sixth data is reconstructed data of one of the plurality of area descriptors or the twenty-seventh data, and the dequantized data of the twenty-seventh data is reconstructed data of one of the plurality of area descriptors. The second decapsulation module is configured to process an input bitstream of the 3D map to output twenty-eighth data. The second prediction module is configured to perform prediction on input residual data of twenty-ninth data to output the twenty-ninth data. The second dequantization module is configured to perform dequantization on input thirtieth data to output dequantized data of the thirtieth data. The twenty-eighth data is the residual data of the twenty-ninth data or the thirtieth data, the twenty-ninth data is reconstructed data of a 3D map point descriptor of one of the plurality of 3D map points or the thirtieth data, and the dequantized data of the thirtieth data is reconstructed data of a 3D map point descriptor of one of the plurality of 3D map points. The third decapsulation module is configured to process an input bitstream of the 3D map to output thirty-first data. The third prediction module is configured to perform prediction on input residual data of thirty-second data to output the thirty-second data. The third dequantization module is configured to perform dequantization on input thirty-third data to output dequantized data of the thirty-third data. The thirty-first data is the residual data of the thirty-second data or the thirty-third data, the thirty-second data is reconstructed data of a 3D map point spatial location of one of the plurality of 3D map points or the thirty-third data, and the dequantized data of the thirty-third data is reconstructed data of a 3D map point spatial location of one of the plurality of 3D map points.

According to a third aspect, this application provides a method for decoding a 3D map, including: receiving a bitstream of a 3D map, where the 3D map includes a plurality of 3D map points; and decompressing the bitstream of the 3D map to obtain reconstructed data of the 3D map, where the reconstructed data of the 3D map includes reconstructed data of the plurality of 3D map points.

In this embodiment of this application, a decompression module may support decompression of compressed data of the 3D map. In other words, an encoding and decoding system may support compression/decompression of data of the 3D map, to reduce a data volume of the 3D map. In a scenario in which a 3D map needs to be transmitted, transmitting compressed data of the 3D map instead of transmitting original data of the 3D map can reduce a data volume for transmission, and can further reduce bandwidth occupied by the transmission, thereby improving transmission efficiency of the 3D map.

In a possible implementation, the reconstructed data of the 3D map further includes reconstructed data of a plurality of area descriptors, and any one of the plurality of area descriptors describes features of a part of or all 3D map points of the plurality of 3D map points.

In a possible implementation, reconstructed data of any one of the plurality of 3D map points includes reconstructed data of a 3D map point descriptor and reconstructed data of a 3D map point spatial location.

In a possible implementation, the method further includes: sending a 3D map download request, where the 3D map download request includes location indication information. The receiving a bitstream of a 3D map includes:

receiving a bitstream that is of the 3D map and that corresponds to the location indication information.

In a possible implementation, the receiving a bitstream of a 3D map includes: receiving the bitstream of the 3D map created by an electronic device.

In a possible implementation, the decompressing the bitstream of the 3D map to obtain reconstructed data of the 3D map includes: processing the bitstream of the 3D map to obtain first data; and performing prediction on residual data of second data to obtain the second data, and/or performing dequantization on third data to obtain dequantized data of the third data. The first data is the residual data of the second data or the third data, the second data is the reconstructed data of the 3D map or the third data, and the dequantized data of the third data is the reconstructed data of the 3D map.

According to a fourth aspect, this application provides an apparatus for decoding a 3D map, including: a memory, configured to store a 3D map that is obtained through compression and that is in a bitstream form, where the 3D map includes a plurality of 3D map points, and data of the 3D map includes data of the plurality of 3D map points; and a decoder, configured to decompress the 3D map that is obtained through compression and that is in the bitstream form, to obtain a reconstructed 3D map, where the reconstructed 3D map includes the plurality of 3D map points, and data of the reconstructed 3D map includes reconstructed data of the plurality of 3D map points.

In a possible implementation, the data of the reconstructed 3D map further includes reconstructed data of a plurality of area descriptors, and any one of the plurality of area descriptors describes features of a part of or all 3D map points of the plurality of 3D map points.

In a possible implementation, reconstructed data of any one of the plurality of 3D map points includes reconstructed data of a 3D map point descriptor and reconstructed data of a 3D map point spatial location.

In a possible implementation, the apparatus for decoding a 3D map is a cloud server or an electronic device.

According to a fifth aspect, this application provides a computer-readable storage medium, including a computer program. When the computer program is executed on a computer, the computer is enabled to perform the method according to any one of the implementations of the third aspect.

According to a sixth aspect, this application provides a computer program product. The computer program product includes computer program code, and when the computer program code is run on a computer, the computer is enabled to perform the method according to any one of the implementations of the third aspect.

According to a seventh aspect, this application provides an encoded bitstream of a 3D map, where the encoded bitstream of the 3D map includes a bitstream of a plurality of 3D map points, and the 3D map includes the plurality of 3D map points.

In a possible implementation, the encoded bitstream of the 3D map further includes a bitstream of a plurality of area descriptors, and any one of the plurality of area descriptors corresponds to at least one 3D map point of the plurality of 3D map points.

In a possible implementation, a bitstream of any one of the plurality of 3D map points includes a bitstream of a 3D map point descriptor and a bitstream of a 3D map point spatial location.

In a possible implementation, the bitstream of any one of the plurality of 3D map points includes residual data of the 3D map point.

In a possible implementation, the bitstream of the 3D map point descriptor includes residual data of the 3D map point descriptor; and/or the bitstream of the 3D map point spatial location includes residual data of the 3D map point spatial location.

In a possible implementation, the bitstream of any one of the plurality of 3D map points further includes indication information of a reference 3D map point, the plurality of 3D map points include the reference 3D map point, and the reference 3D map point is a 3D map point that has been encoded before the 3D map point is encoded.

In a possible implementation, a bitstream of any one of the plurality of 3D map points includes quantized data of the 3D map point.

In a possible implementation, the bitstream of the 3D map point descriptor includes quantized data of the 3D map point descriptor; and/or the bitstream of the 3D map point spatial location includes quantized data of the 3D map point spatial location.

In a possible implementation, a bitstream of any one of the plurality of area descriptors includes residual data of the area descriptor.

In a possible implementation, the bitstream of any one of the plurality of area descriptors further includes indication information of a reference area descriptor, and the plurality of area descriptors include the reference area descriptor.

In a possible implementation, a bitstream of any one of the plurality of area descriptors includes quantized data of the area descriptor.

DESCRIPTION OF EMBODIMENTS

The following describes embodiments of this application with reference to accompanying drawings in this application. The described embodiments are merely some but not all of embodiments of this application. Based on embodiments of this application, all other embodiments obtained by a person of ordinary skill in the art without creative efforts fall within the protection scope of this application.

In embodiments of the specification, claims, and accompanying drawings of this application, the terms "first", "second", and the like are merely intended for distinguishing and description, and shall not be understood as an indication or implication of relative importance or an indication or implication of an order. In addition, the terms "include", "have", and any variant thereof are intended to cover non-exclusive inclusion, for example, inclusion of a series of steps or units. A method, a system, a product, or a device is not necessarily limited to listed steps or units, but may include other steps or units that are not listed and that are inherent to the process, the method, the product, or the device.

It should be understood that, in this application, "at least one (item)" is one or more, and "a plurality of" is two or more. The term "and/or" describes an association relationship of associated objects, and indicates that three relationships may exist. For example, "A and/or B" may indicate the following three cases: Only A exists, only B exists, and both A and B exist. A and B may be singular or plural. The character "/" usually indicates an "or" relationship between associated objects. "At least one of the following items" or a similar expression thereto indicates any combination of the items, including one of the items or any combination of a plurality of the items. For example, at least one of a, b, or c may indicate a, b, c, a and b, a and c, b and c, or a, b, and c, where a, b, and c may be singular or plural.

Figure 1:
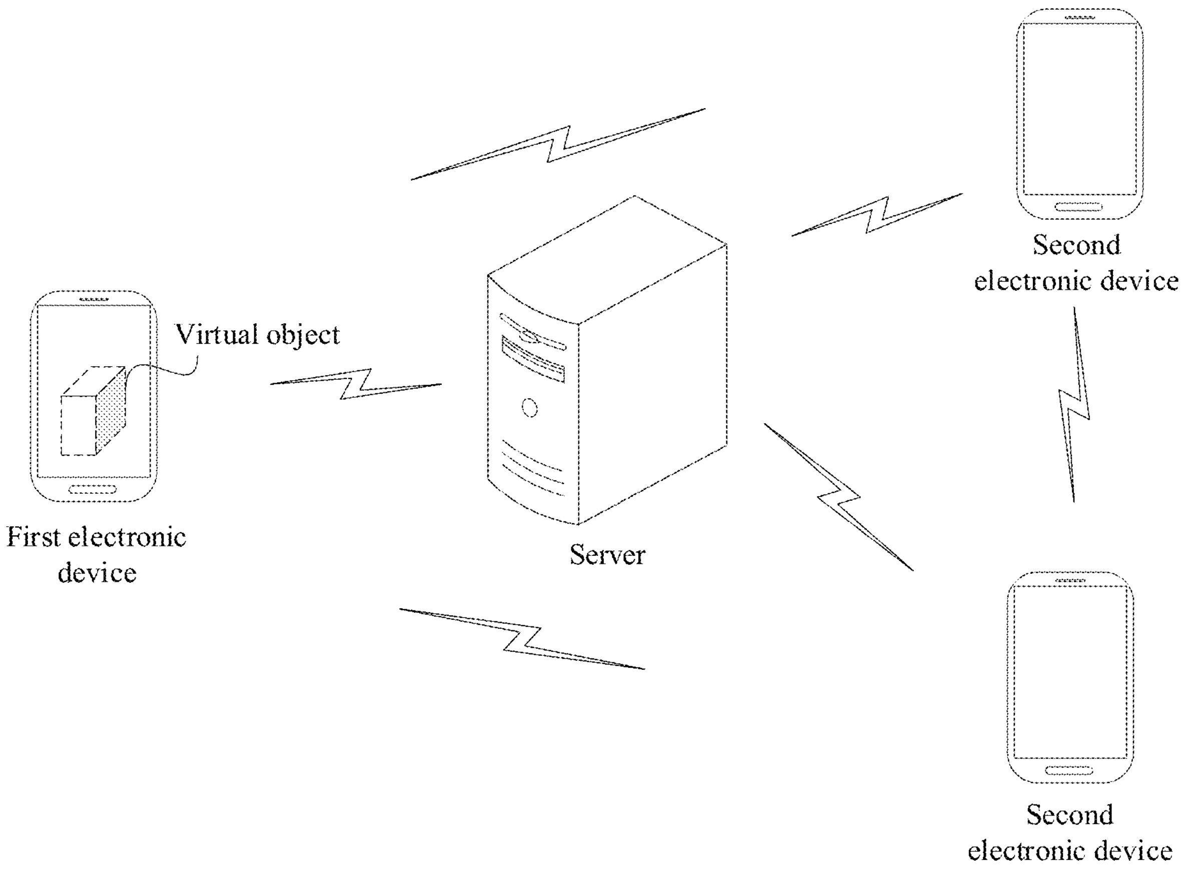
FIG. 1 is a schematic diagram of an application architecture according to an embodiment of this application.

FIG. 1 is a schematic diagram of an application architecture according to an embodiment of this application. As shown in FIG. 1, the application architecture includes a plurality of electronic devices and a server. The plurality of electronic devices may include a first electronic device and one or more second electronic devices (two second electronic devices are used as an example in FIG. 1). The one or more second electronic devices are electronic devices other than the first electronic device. Communication may be performed between the plurality of electronic devices and the server and between the plurality of electronic devices. For example, any device in the application architecture may communicate with another device in a manner such as wireless fidelity (Wi-Fi) communication, Bluetooth communication, or cellular 2nd/3rd/4th/5th generation (2G/3G/4G/

5G) communication. It should be understood that another communication manner, including a future communication manner, may be further used between the server and the electronic device. This is not specifically limited herein. It should be noted that "one or more second electronic devices" in this embodiment of this application is merely used to represent an electronic device other than the first electronic device, but whether types of the plurality of electronic devices are the same is not limited.

The electronic devices may be various types of devices provided with cameras and display components. For example, the electronic device may be a terminal device such as a mobile phone, a tablet computer, a notebook computer, or a video recorder (a mobile phone is used as an example of the electronic device in FIG. 1). Alternatively, the electronic device may be a device used for interaction in a virtual scenario, including VR glasses, an AR device, an MR interaction device, or the like. Alternatively, the electronic device may be a wearable electronic device such as a smartwatch or a smart band. Alternatively, the electronic device may be a device carried in a carrying device such as a vehicle, an uncrewed vehicle, an uncrewed aerial vehicle, or an industrial robot. A specific form of the electronic device is not specially limited in embodiments of this application.

In addition, the electronic device may also be referred to as user equipment (UE), a subscriber station, a mobile unit, a subscriber unit, a wireless unit, a remote unit, a mobile device, a wireless device, a wireless communication device, a remote device, a mobile subscriber station, a terminal device, an access terminal, a mobile terminal, a wireless terminal, a smart terminal, a remote terminal, a handheld terminal, a user agent, a mobile client, a client, or another proper term.

The server may be one or more physical servers (one physical server is used as an example in FIG. 1), or may be a computer cluster, or may be a virtual machine or a cloud server in a cloud computing scenario, or the like.

In this embodiment of this application, a virtual scenario application (APP) such as a VR application, an AR application, or an MR application may be installed on the electronic device, and the VR application, the AR application, or the MR application may be run based on a user operation (for example, tap, touch, slide, shake, or voice control). The electronic device may collect visual information of any object in an environment by using a sensor, and then display a virtual object on a display component based on the collected visual information. The virtual object may be a virtual object (namely, an object in a virtual environment) in a VR scenario, an AR scenario, or an MR scenario.

In this embodiment of this application, a navigation, detection, or control application may be installed on the electronic device, and a corresponding application is run based on operations and control of a user or a preset program. The electronic device may perform applications such as route planning, object detection, and carrying device operations and control based on a pose and other status information of the electronic device in a current environment.

The visual information in embodiments of this application includes but is not limited to an image video (without depth information) collected by a camera, an image video (with depth information) collected by a depth sensor, data collected by a lidar (LiDAR), and data collected by a millimeter-wave radar (RaDAR).

It should be noted that, in this embodiment of this application, the virtual scenario application in the electronic device may be an application built in the electronic device, or may be an application that is provided by a third-party service provider and that is installed by the user. This is not specifically limited herein.

In this embodiment of this application, a simultaneous localization and mapping (SLAM) system may be further configured for the electronic device. The SLAM system can create a map in a completely unknown environment, and use the map to perform positioning, pose (location and posture) determining, navigation, and the like. In this embodiment of this application, a map created by the SLAM system is referred to as a SLAM map. The SLAM map may be understood as a map drawn by the SLAM system based on environment information collected by a collection device. The collection device may include a visual information collection apparatus and an inertia measurement unit (IMU) in the electronic device. The visual information collection apparatus may include, for example, a camera, a depth camera, a lidar, and a millimeter-wave radar. The IMU may include, for example, a sensor such as a gyroscope and an accelerometer.

In embodiments of this application, the SLAM map is also referred to as a 3D map. It should be noted that the 3D map includes but is not limited to a SLAM map, and may further include a three-dimensional map created by using another technology. This is not specifically limited in embodiments of this application.

In a possible implementation, the 3D map may include a plurality of 3D map points, and correspondingly, data of the 3D map may include data of the plurality of 3D map points. The 3D map point is a point of interest or a point having a significant feature in an environment.

A possible manner of obtaining a 3D map point is to use a plurality of devices such as a lidar, aerial photography (tilt photography) from an angle of view of an uncrewed aerial vehicle, a high-definition panoramic camera, and a high-definition industrial camera to perform shooting, and extract a 3D map point, from data obtained through shooting by the foregoing devices, by using a method such as oriented features from accelerated segment test (FAST) and rotated binary robust independent elementary features (BRIEF) descriptor features (oriented FAST and rotated BRIEF, ORB), scale-invariant feature transform (SIFT), and speeded-up robust feature (SURF), BRIEF, binary robust invariant scalable keypoints (BRISK), fast retinal keypoint (FREAK), or repeatable and reliable detector and descriptor (R2D2).

Data of a 3D map point may include the following.

(1) 3D Map Point Descriptor

A 3D map point descriptor is a vector used to represent a local feature of a 3D map point. In a visual positioning algorithm, a 3D map point descriptor is used for matching between 3D map points. A possible method is: calculating a distance (which may be a Euclidean distance, an inner product distance, a Hamming distance, or the like) between two 3D map point descriptors; and when the distance is less than a threshold, considering that the two 3D map points match.

(2) 3D Map Point Spatial Location

A 3D map point spatial location may be represented by using X, Y, and Z on three-dimensional spatial axes, or may be represented by using a longitude, a latitude, and an altitude, or may be represented by using polar coordinates or the like. A method for representing a 3D map point spatial location is not specifically limited in embodiments of this application. The 3D map point spatial location may be an absolute location of a 3D map point or a relative location of a 3D map point. For example, a central location of an entire area is used as an origin, and all 3D map point spatial locations are offset locations relative to a spatial location of the origin.

In embodiments of this application, a number may be allocated to each 3D map point and written into data of the 3D map, or a storage sequence of a plurality of 3D map points in a memory may be used to implicitly indicate numbers of the 3D map points. It should be noted that the sequence of the plurality of 3D map points included in the 3D map is meaningless. Therefore, the foregoing numbers may be considered as identifiers used to identify the 3D map points, to distinguish between the 3D map points. However, the numbers are not intended to limit the sequence of the plurality of 3D map points. For example, a 3D map includes three 3D map points whose numbers are respectively 1, 2, and 3, and the three 3D map points may be processed in an order of 1, 2, and 3, or in an order of 3, 2, and 1, or in an order of 2, 1, and 3, or the like.

In a possible implementation, the data of the 3D map further includes a plurality of area descriptors, and any one of the plurality of area descriptors describes features of a part of or all 3D map points of the plurality of 3D map points. To be specific, for any one of the plurality of area descriptors, the area descriptor may describe features of a part of or all 3D map points of the plurality of 3D map points. In this case, the area descriptor and the 3D map point are in a one-to-many relationship. A feature of each of the plurality of 3D map points may be described by a part of or all area descriptors of the plurality of area descriptors. In this case, the 3D map point and the area descriptor are in a one-to-many relationship. It can be learned that a plurality of area descriptors and a plurality of 3D map points are in a many-to-many relationship. A method for generating an area descriptor includes but is not limited to a conventional method such as a bag of words (BOW) and a vector of locally aggregated descriptor (VLAD), and a novel method based on NetVLAD or artificial intelligence (AI). Similarly, a plurality of area descriptors may be identified by numbers to distinguish between the plurality of area descriptors. Similarly, however, the numbers are not intended to limit a sequence of the plurality of area descriptors.

In a possible implementation, the data of the 3D map further includes a correspondence between a 3D map point and an area descriptor. The correspondence describes which 3D map points any area descriptor corresponds to and which area descriptors any 3D map point corresponds to.

Optionally, the foregoing correspondence may be explicitly described by using a correspondence table between a number of an area descriptor and a number of a 3D map point. For example, the 3D map includes three area descriptors whose numbers are T1 to T3, and six 3D map points whose numbers are P1 to P6. The correspondence table is shown in Table 1.

TABLE 1

| Number of area descriptor | Number of 3D map point |
|---|---|
| T1 | P1 |
| | P2 |
| | P3 |
| T2 | P2 |
| | P3 |
| T3 | P3 |
| | P4 |
| | P5 |
| | P6 |

It should be noted that, Table 1 is an example of a correspondence table between a number of an area descriptor and a number of a 3D map point. The correspondence table may alternatively be presented in another format or manner. This is not specifically limited in this application.

Optionally, the foregoing correspondence may alternatively be implicitly described by using storage locations of an area descriptor and a 3D map point. For example, T1 is first stored in the memory, and then data of P1, P2, and P3 is stored; then T2 is stored, and then data of P2 and P3 is stored; and finally, T3 is stored, and then data of P3, P4, P5, and P6 is stored.

Figure 2:
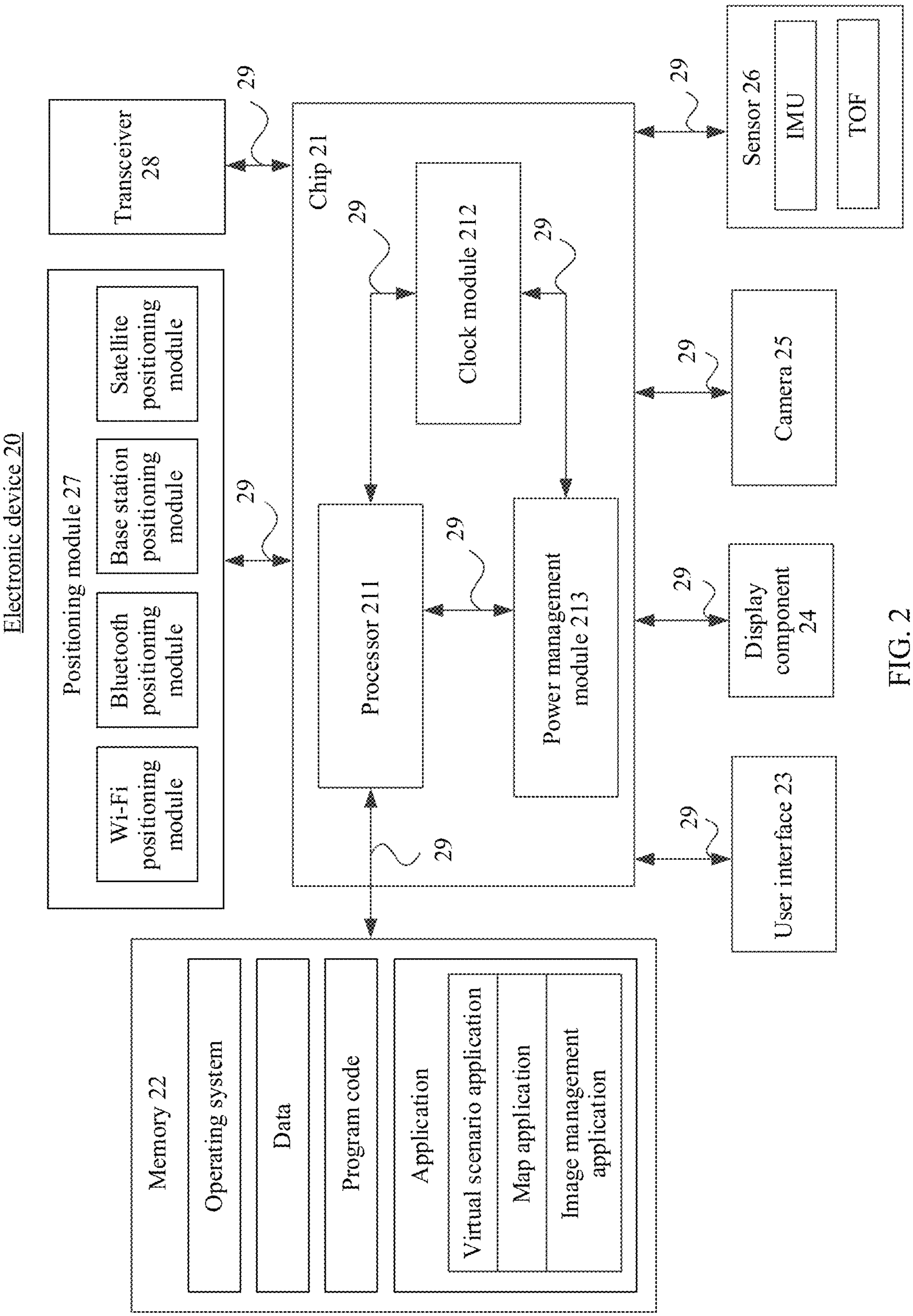
FIG. 2 is a schematic diagram of a structure of an electronic device 20 according to an embodiment of this application.

FIG. 2 is a schematic diagram of a structure of an electronic device 20 according to an embodiment of this application. As shown in FIG. 2, the electronic device 20 may be at least one of the first electronic device and one or more second electronic devices in the embodiment shown in FIG. 1. It should be understood that the structure shown in FIG. 2 does not constitute a specific limitation on the electronic device 20. In some other embodiments of this application, the electronic device 20 may include more or fewer components than those shown in FIG. 2, or combine some components, or split some components, or have different component arrangements. The components shown in FIG. 2 may be implemented in hardware including one or more signal processing and/or application-specific integrated circuits, software, or a combination of hardware and software.

The electronic device 20 may include a chip 21, a memory 22 (one or more computer-readable storage media), a user interface 23, a display component 24, a camera 25, a sensor 26, a positioning module 27 configured to perform device positioning, and a transceiver 28 configured to perform communication. These components may communicate with each other by using one or more buses 29.

One or more processors 211, a clock module 212, and a power management module 213 may be integrated into the chip 21. The clock module 212 integrated in the chip 21 is mainly configured to provide a timer for data transmission and timing control for the processor 211. The timer may implement clock functions of data transmission and timing control. The processor 211 may execute an operation and generate an operation control signal based on an instruction operation code and a timing signal, to complete control of instruction fetching and instruction execution. The power management module 213 integrated in the chip 21 is mainly configured to provide a stable and high-precision voltage for the chip 21 and another component of the electronic device 20.

The processor 211 may also be referred to as a central processing unit (CPU). The processor 211 may include one or more processing units. For example, the processor 211 may include an application processor (AP), a modem processor, a graphics processing unit (GPU), an image signal processor (ISP), a controller, a video codec, a digital signal processor (DSP), a baseband processor, a neural processing unit (NPU), and/or the like. Different processing units may be independent components, or may be integrated into one or more processors.

In a possible implementation, the processor 211 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The memory 22 may be connected to the processor 211 through the bus 29, or may be coupled to the processor 211, and is configured to store various software programs and/or a plurality of groups of instructions. The memory 22 may include a high-speed random access memory (for example, a cache), or may include a nonvolatile memory, for example, one or more magnetic disk storage devices, a flash memory device, or another nonvolatile solid-state storage device. The memory 22 may store an operating system, for example, an embedded operating system such as Android, an Apple mobile platform (iOS), a Microsoft window operating system (Windows), or a UNIX-like operating system (Linux). The memory 22 may further store data, for example, image data, point cloud data, 3D map data, pose data, coordinate system conversion information, and map update information. The memory 22 may further store computer-executable program code. The computer-executable program code includes instructions, for example, communication program instructions and related program instructions of a SLAM system. The memory 22 may further store one or more applications, for example, a virtual scenario application such as AR/VR/MR, a 3D map application, an image management application, and a navigation and control application. The memory 22 may further store a user interface program. The user interface program may vividly display content of an application, for example, a virtual object in a virtual scenario such as AR/VR/MR, by using a graphical operation interface, present the content by using the display component 24, and receive a control operation performed by a user on the application by using an input control such as a menu, a dialog box, or a button.

The user interface 23 may be, for example, a touch panel. The touch panel may detect an instruction of an operation of the user on the touch panel. The user interface 23 may be, for example, a keypad, a physical button, or a mouse.

The electronic device 20 may include one or more display components 24. The electronic device 20 may implement a display function jointly by using the display component 24, a graphics processing unit (GPU) and an application processor (AP) in the chip 21, and the like. The GPU is a microprocessor for implementing image processing, and is connected to the display component 24 and the application processor. The GPU performs mathematical and geometric calculation for graphics rendering. The display component 24 may display interface content output by the electronic device 20, for example, display an image, a video, and the like in a virtual scenario such as AR/VR/MR. The interface content may include an interface of a running application, a system-level menu, and the like, and may include the following interface elements: input interface elements, such as a button (Button), a text input box (Text), a scrollbar (Scrollbar), and a menu (Menu); and output interface elements, such as a window (Window), a label (Label), an image, a video, and an animation.

The display component 24 may be a display panel, a lens (for example, VR glasses), a projection screen, or the like. The display panel may also be referred to as a display screen, for example, may be a touchscreen, a flexible screen, a curved screen, or the like, or may be another optical component. It should be understood that the display screen of the electronic device in embodiments of this application may be a touchscreen, a flexible screen, a curved screen, or a screen in another form. In other words, the display screen of the electronic device has a function of displaying an image, and a specific material and shape of the display screen are not specifically limited.

For example, when the display component 24 includes a display panel, the display panel may use a liquid crystal display (LCD), an organic light-emitting diode (OLED), an active matrix organic light-emitting diode or an active-matrix organic light-emitting diode (AMOLED), a flexible light-emitting diode (FLED), a MiniLed, a MicroLed, a Micro-oLed, a quantum dot light-emitting diode (QLED), or the like. In addition, in a possible implementation, the touch panel in the user interface 23 may be coupled to the display panel in the display component 24. For example, the touch panel may be disposed below the display panel, the touch panel is configured to detect touch pressure that acts on the display panel when the user enters a touch operation (for example, tap, slide, or touch) by using the display panel, and the display panel is configured to display content.

The camera 25 may be a monocular camera, a binocular camera, or a depth camera, and is configured to photograph/record an environment to obtain an image/video image. The image/video image collected by the camera 25 may be, for example, used as input data of the SLAM system, or an image/video may be displayed by using the display component 24.

In a possible implementation, the camera 25 may also be considered as a sensor. The image collected by the camera 25 may be in an IMG format, or may be in another format type. This is not specifically limited in embodiments of this application.

The sensor 26 may be configured to collect data related to a status change (for example, rotation, swing, movement, or jitter) of the electronic device 20. The data collected by the sensor 26 may be used as input data of the SLAM system. The sensor 26 may include one or more sensors, for example, an inertia measurement unit (IMU) and a time of flight (TOF) sensor. The IMU may include sensors such as a gyroscope and an accelerometer. The gyroscope is configured to measure an angular velocity of the electronic device when the electronic device moves, and the accelerometer is configured to measure acceleration of the electronic device when the electronic device moves. The TOF sensor may include an optical transmitter and an optical receiver. The optical transmitter is configured to emit light outward, for example, laser light, an infrared ray, or a radar wave. The optical receiver is configured to detect reflected light, for example, reflected laser light, an infrared ray, or a radar wave.

It should be noted that the sensor 26 may further include more other sensors, such as an inertia sensor, a barometer, a magnetometer, and a wheel speedometer. This is not specifically limited in embodiments of this application.

The positioning module 27 is configured to implement physical positioning of the electronic device 20, for example, configured to obtain an initial location of the electronic device 20. The positioning module 27 may include one or more of a Wi-Fi positioning module, a Bluetooth positioning module, a base station positioning module, and a satellite positioning module. A global navigation satellite system (GNSS) may be disposed in the satellite positioning module to assist in positioning. The GNSS is not limited to a BeiDou system, a Global Positioning System (GPS) system, a global navigation satellite system (GLONASS) system, and a Galileo Navigation Satellite System (Galileo) system.

The transceiver 28 is configured to implement communication between the electronic device 20 and another device (for example, a server or another electronic device). The transceiver 28 integrates a transmitter and a receiver, which are respectively configured to send and receive a radio frequency signal. In an exemplary implementation, the transceiver 28 includes but is not limited to an antenna system, a radio frequency (RF) transceiver, one or more amplifiers, a tuner, one or more oscillators, a digital signal processor, a codec (CODEC) chip, a subscriber identity module (SIM) card, a storage medium, and the like. In a possible implementation, the transceiver 28 may be alternatively implemented on a separate chip. The transceiver 28 supports at least one data network communication in 2G/3G/4G/5G or the like, and/or supports at least one of the following short-range wireless communication manners: Bluetooth (BT) communication, Wireless Fidelity (Wi-Fi) communication, near-field communication (NFC), infrared (IR) wireless communication, ultra-wideband (UWB) communication, and ZigBee protocol communication.

In this embodiment of this application, the processor 211 runs program code stored in the memory 22, to perform various function applications and data processing of the electronic device 20.

Figure 3:
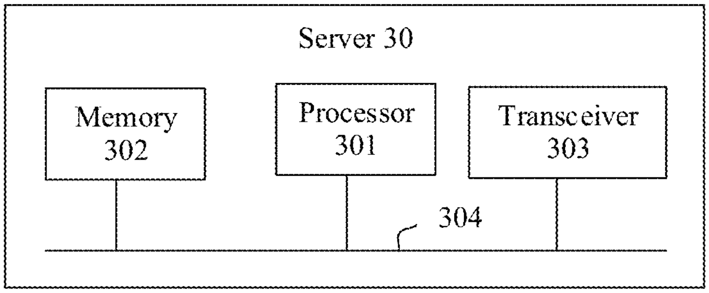
FIG. 3 is a schematic diagram of a structure of a server 30 according to an embodiment of this application.

FIG. 3 is a schematic diagram of a structure of a server 30 according to an embodiment of this application. As shown in FIG. 3, the server 30 may be the server in the embodiment shown in FIG. 1. The server 30 includes a processor 301, a memory 302 (one or more computer-readable storage media), and a transceiver 303. These components may communicate with each other by using one or more buses 304.

The processor 301 may be one or more CPUs. When the processor 301 is one CPU, the CPU may be a single-core CPU, or may be a multi-core CPU.

The memory 302 may be connected to the processor 301 through the bus 304, or may be coupled to the processor 301, and is configured to store various program code and/or a plurality of groups of instructions and data (for example, map data and pose data). In an exemplary implementation, the memory 302 includes but is not limited to a random access memory (RAM), a read-only memory (ROM), an erasable programmable read-only memory (EPROM), a portable read-only memory (Compact Disc Read-Only Memory, CD-ROM), or the like.

The transceiver 303 mainly integrates a receiver and a transmitter. The receiver is configured to receive data (for example, a request or an image) sent by an electronic device, and the transmitter is configured to send data (for example, map data or pose data) to the electronic device.

It should be understood that the server 30 shown in FIG. 3 is merely an example provided in this embodiment of this application, and the server 30 may further have more components than those shown in the figure. This is not specifically limited in embodiments of this application.

In this embodiment of this application, the processor 301 runs program code stored in the memory 302, to perform various function applications and data processing of the server 30.

The term "coupling" used in embodiments of this application means a direct connection or a connection through one or more intermediate components or circuits.

Figure 4A:
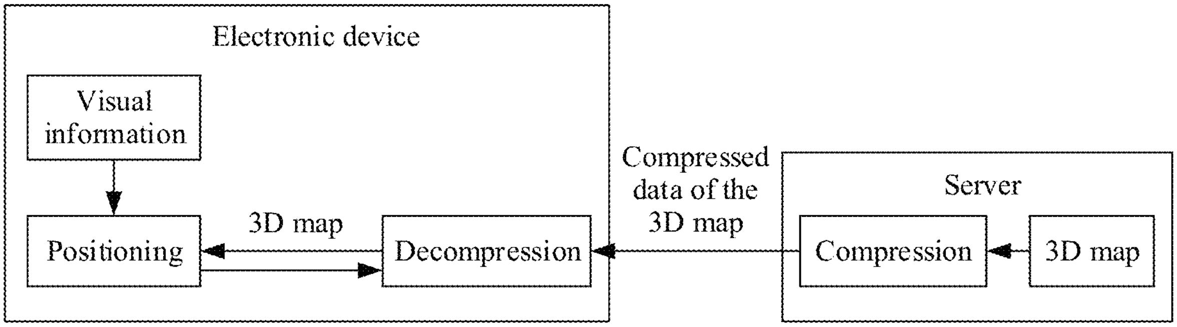
FIG. 4*a* is a schematic diagram of an application scenario according to an embodiment of this application.

FIG. 4*a* is a schematic diagram of an application scenario according to an embodiment of this application. As shown in FIG. 4*a*, in the application scenario, an electronic device collects visual information by using a sensor, and determines a current pose of the electronic device with reference to the visual information and a 3D map from a server.

The 3D map is provided by the server. To be specific, the server creates the 3D map, then compresses the 3D map, and transmits compressed data of the 3D map to the electronic device. After receiving the compressed data of the 3D map, the electronic device performs decompression to obtain reconstructed data of the 3D map, and determines the current pose of the electronic device with reference to the collected visual information and the 3D map. The pose is location information of the electronic device, and may be an absolute pose in the world coordinate system, or may be a relative pose relative to a point in an environment.

In this embodiment of this application, the server may create the 3D map in advance, compress the 3D map, and then store compressed data of the 3D map locally. In this way, storage space can be saved. In addition, the server may transmit the compressed data of the 3D map to another device, for example, a cloud storage.

1. The server creates the 3D map, compresses the 3D map to obtain compressed data of the 3D map, and stores the compressed data locally.

The server compresses the 3D map, to save local storage space.

2. The electronic device sends a map download request to the server. The map download request is triggered in two manners:

(1) A user starts a 3D map application installed on the electronic device, and the application uploads, to a server corresponding to the application, location information obtained based on GPS positioning or Wi-Fi positioning. The upload operation may trigger a map download request. Because uploaded content includes the location information, the server may perform preliminary estimation based on the location information, and transmit, to the electronic device, compressed data of a 3D map of an area to which a positioning point indicated by the location information belongs. A range of the area to which the positioning point indicated by the location information belongs may be preset. For example, the area to which the positioning point belongs may be an administrative region (including a county, a city, a country, or an administrative region) at any level in which the positioning point is located, or may be a circular area centered on the positioning point and using a specified distance as a radius.

(2) The user starts a 3D map application installed on the electronic device, and actively enters or selects an area on the application. For example, the user actively enters "xx business center", or selects "street A" from a list of "street A, street B, and street C". The foregoing operations of the user may trigger a map download request. Regardless of whether the user enters or selects a geographical location, the server accordingly transmits compressed data of a 3D map of the geographical location to the electronic device.

It should be understood that, in this embodiment of this application, in addition to the foregoing two manners, another manner may be used for triggering a map download request. For example, the electronic device automatically detects whether a condition for downloading a 3D map or starting downloading a 3D map is satisfied, or the electronic device starts downloading a 3D map upon detecting an ambient light change or an environment change, to request downloading of a 3D map of an area range from the server. A size of the area range is not specifically limited.

3. The server sends the compressed data of the 3D map to the electronic device.

4. The electronic device collects the visual information.

It should be noted that step 3 and step 4 are independent of each other, and a sequence is not limited.

5. The electronic device decompresses the compressed data of the 3D map to obtain the reconstructed data of the 3D map.
6. The electronic device performs positioning in the 3D map based on the visual information, to obtain a pose corresponding to the visual information.

After receiving the compressed data of the 3D map, the electronic device does not need to immediately decompress the compressed data, and needs to decompress the compressed data to obtain the reconstructed data of the 3D map only before performing positioning based on the visual information. For example, the user may pre-download compressed data of a 3D map of an area range by downloading an "offline map", and decompress the compressed data of the 3D map only when positioning is required.

Figure 4B:
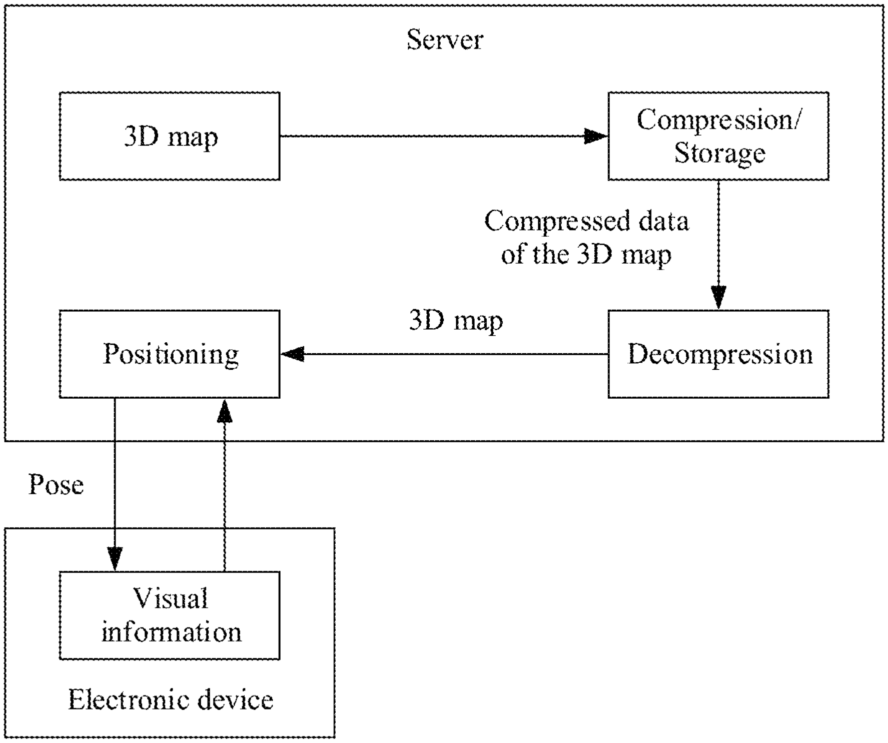
FIG. 4*b* is a schematic diagram of an application scenario according to an embodiment of this application.

FIG. 4*b* is a schematic diagram of an application scenario according to an embodiment of this application. As shown in FIG. 4*b*, in the application scenario, an electronic device collects visual information by using a sensor, and a server determines a current pose of the electronic device with reference to the visual information from the electronic device and a 3D map.

The 3D map is provided by the server. To be specific, the server creates the 3D map, then compresses the 3D map, and stores compressed data of the 3D map locally. When receiving the visual information from the electronic device, the server performs decompression to obtain reconstructed data of the 3D map, and determines the current pose of the electronic device with reference to the visual information and the 3D map.

1. The server creates the 3D map, compresses the 3D map to obtain compressed data of the 3D map, and stores the compressed data locally.
2. The electronic device collects the visual information.
3. The electronic device sends the visual information to the server.
4. The server decompresses the compressed data of the 3D map to obtain the reconstructed data of the 3D map.

It should be understood that the server compresses the 3D map to save storage space.

5. The server performs positioning in the 3D map based on the visual information, to obtain a pose corresponding to the visual information.
6. The server sends the pose to the electronic device.

Figure 4C:
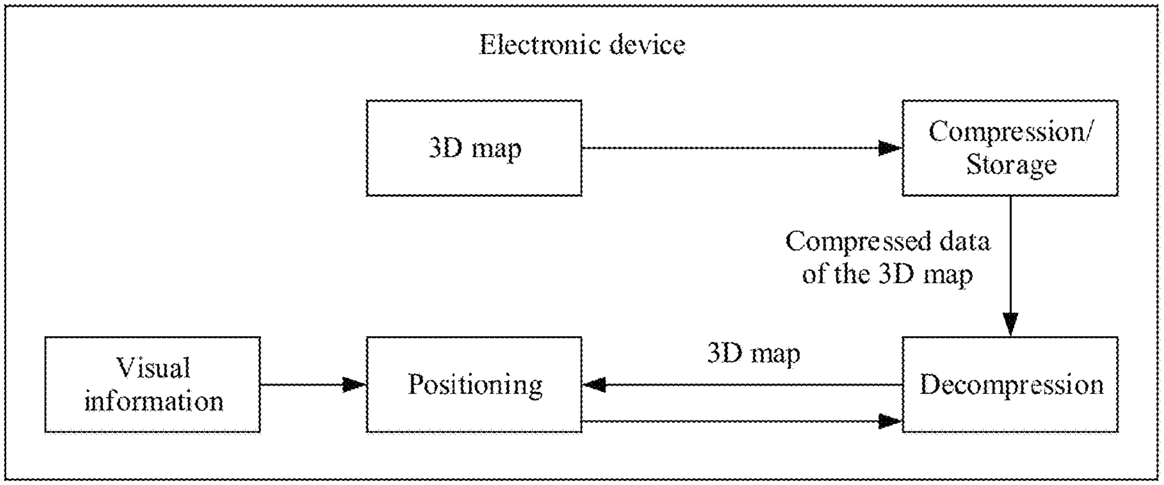
FIG. 4*c* is a schematic diagram of an application scenario according to an embodiment of this application.

FIG. 4*c* is a schematic diagram of an application scenario according to an embodiment of this application. As shown in FIG. 4*c*, in the application scenario, an electronic device collects visual information by using a sensor, and determines a current pose of the electronic device with reference to the visual information and a 3D map.

The 3D map is provided by the electronic device. To be specific, the electronic device creates the 3D map, then compresses the 3D map, and stores compressed data of the 3D map locally. When the visual information is collected, the electronic device performs decompression to obtain reconstructed data of the 3D map, and determines the current pose of the electronic device with reference to the collected visual information and the 3D map.

1. The electronic device creates the 3D map, compresses the 3D map to obtain compressed data of the 3D map, and stores the compressed data locally.

It should be understood that the electronic device compresses the 3D map to save storage space.

2. The electronic device collects the visual information by using the sensor.
3. The electronic device decompresses the compressed data of the 3D map to obtain the reconstructed data of the 3D map.
4. The electronic device performs positioning in the 3D map based on the visual information, to obtain a pose corresponding to the visual information.

Figure 4D:
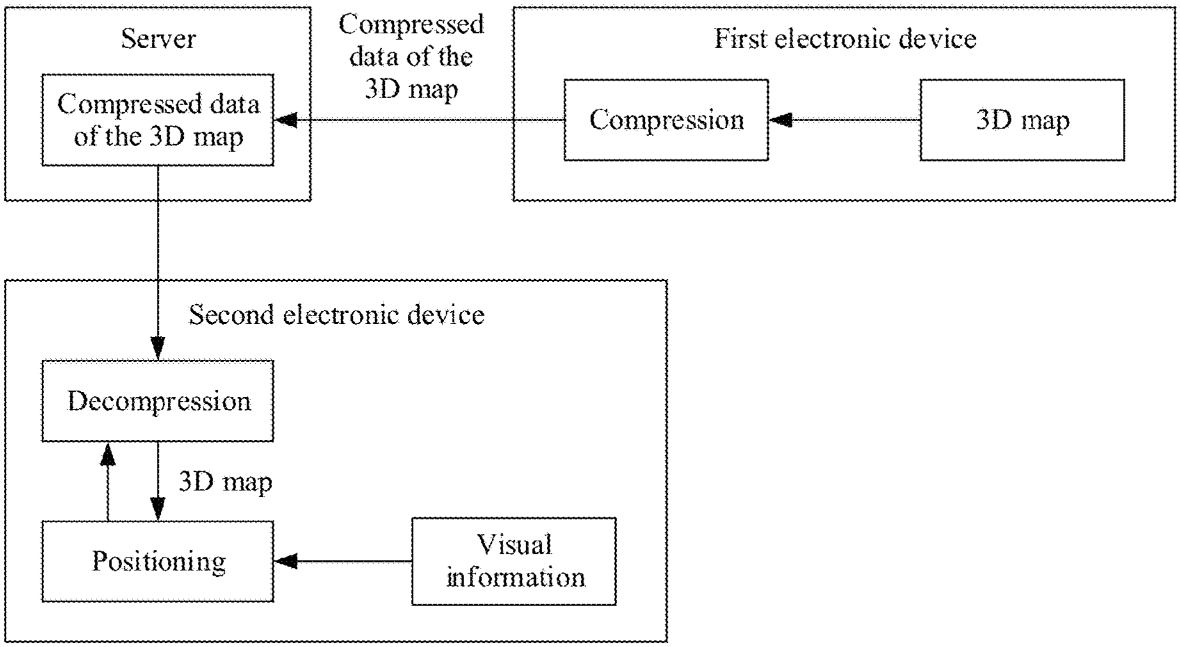
FIG. 4*d* is a schematic diagram of an application scenario according to an embodiment of this application.

FIG. 4*d* is a schematic diagram of an application scenario according to an embodiment of this application. As shown in FIG. 4*d*, in the application scenario, a second electronic device collects visual information by using a sensor, and determines a current pose of the second electronic device with reference to the visual information and a 3D map from a server.

The 3D map is created by the first electronic device. To be specific, the first electronic device creates the 3D map, compresses the 3D map, and then sends compressed data of the 3D map to the server. The server then sends the compressed data of the 3D map to the second electronic device. The second electronic device performs decompression to obtain reconstructed data of the 3D map, and determines the current pose of the second electronic device with reference to the collected visual information and the 3D map.

In this embodiment of this application, the first electronic device may create the 3D map in advance, compress the 3D map, and then transmit the compressed data of the 3D map to the server. In this way, transmission bandwidth can be reduced.

1. The first electronic device creates the 3D map, compresses the 3D map to obtain the compressed data of the 3D map.
2. The first electronic device sends the compressed data of the 3D map to the server.

The first electronic device compresses the 3D map and then transmits the compressed data of the 3D map, to reduce transmission bandwidth, and improve transmission efficiency.

3. The second electronic device sends a map download request to the server.

The second electronic device may send the map download request based on a trigger manner shown in FIG. 4*a*.

4. The server sends the compressed data of the 3D map to the second electronic device.
5. The second electronic device decompresses the compressed data of the 3D map to obtain the reconstructed data of the 3D map.
6. The second electronic device collects the visual information by using the sensor.
7. The second electronic device performs positioning in the 3D map based on the visual information, to obtain a pose corresponding to the visual information.

Figure 4E:
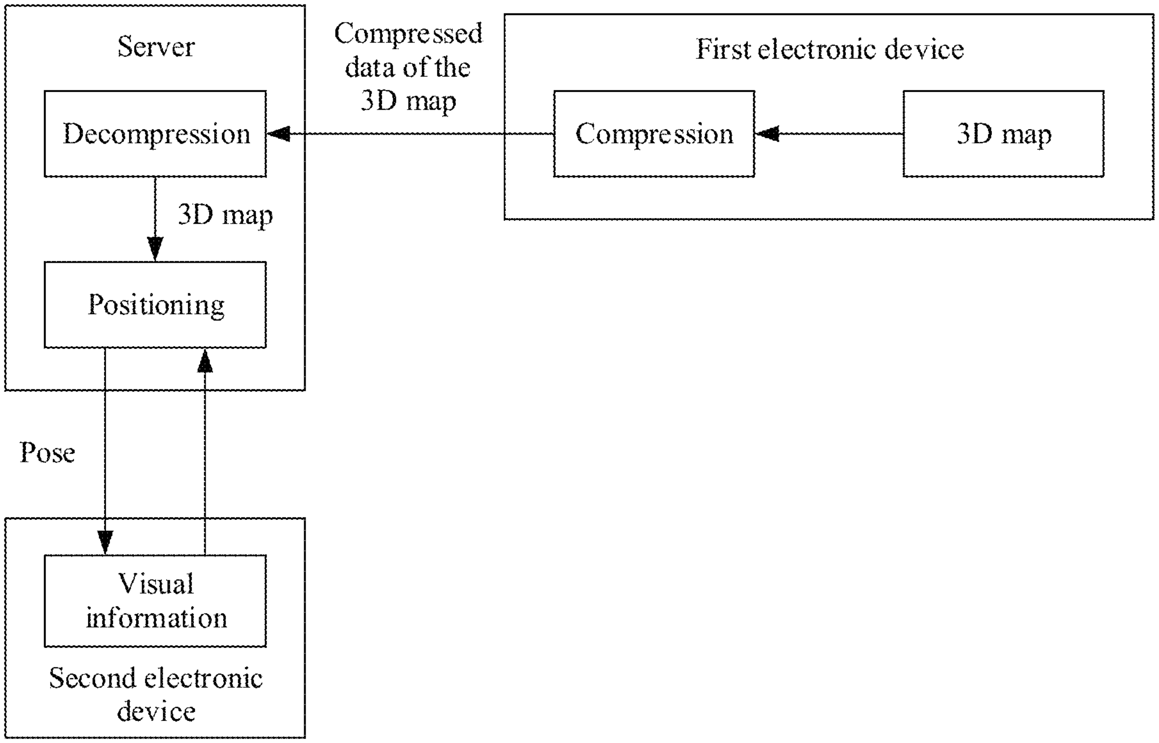
FIG. 4*e* is a schematic diagram of an application scenario according to an embodiment of this application.

FIG. 4*e* is a schematic diagram of an application scenario according to an embodiment of this application. As shown in FIG. 4*c*, in the application scenario, a second electronic device collects visual information by using a sensor, and a server determines a current pose of the second electronic device with reference to the visual information from the second electronic device and a 3D map from a first electronic device.

The 3D map is created by the first electronic device. To be specific, the first electronic device creates the 3D map, compresses the 3D map, and then sends compressed data of the 3D map to the server. The server performs decompression to obtain reconstructed data of the 3D map, and determines the current pose of the second electronic device with reference to the visual information from the second electronic device and the 3D map.

1. The first electronic device creates the 3D map, compresses the 3D map to obtain the compressed data of the 3D map.
2. The first electronic device sends the compressed data of the 3D map to the server.
3. The second electronic device collects the visual information by using the sensor.
4. The second electronic device sends a positioning request to the server, where the positioning request carries the visual information.
5. The server decompresses the compressed data of the 3D map to obtain the reconstructed data of the 3D map.
6. The server performs positioning in the 3D map based on the visual information, to obtain a pose corresponding to the visual information.
7. The server sends, to the second electronic device, the pose obtained through positioning.

Figure 4F:
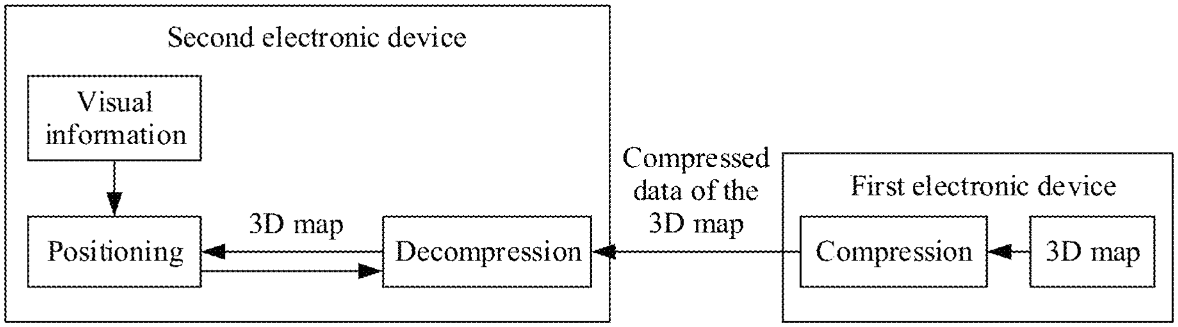
FIG. 4*f* is a schematic diagram of an application scenario according to an embodiment of this application.

FIG. 4*f* is a schematic diagram of an application scenario according to an embodiment of this application. As shown in FIG. 4*d*, in the application scenario, a second electronic device collects visual information by using a sensor, and determines a current pose of the second electronic device with reference to the visual information and a 3D map from a first electronic device.

The 3D map is created by the first electronic device. To be specific, the first electronic device creates the 3D map, compresses the 3D map, and then sends compressed data of the 3D map to the second electronic device. The second electronic device performs decompression to obtain reconstructed data of the 3D map, and determines the current pose of the second electronic device with reference to the collected visual information and the 3D map from the first electronic device.

1. The first electronic device creates the 3D map, compresses the 3D map to obtain compressed data of the 3D map, and stores the compressed data locally.
2. The second electronic device sends a map download request to the first electronic device.
3. The first electronic device sends the compressed data of the 3D map to the second electronic device.
4. The second electronic device decompresses the compressed data of the 3D map to obtain the reconstructed data of the 3D map.
5. The second electronic device collects the visual information by using the sensor.
6. The second electronic device performs positioning in the 3D map based on the visual information, to obtain a pose corresponding to the visual information.

A positioning algorithm used in the embodiments shown in FIG. 4*a* to FIG. 4*f* may include the following.

(1) A to-be-retrieved area descriptor is extracted from the visual information, where an algorithm used for extracting the to-be-retrieved area descriptor is consistent with an algorithm for extracting an area descriptor from the 3D map.

(2) A to-be-retrieved 3D map point is extracted from the visual information, and a to-be-retrieved 3D map point spatial location and a to-be-retrieved 3D map point descriptor are obtained, where an algorithm for extracting the to-be-retrieved 3D map point descriptor is consistent with an algorithm for extracting a 3D map point descriptor from the 3D map.

(3) Retrieval is performed in a plurality of area descriptors included in data of the 3D map based on the to-be-retrieved area descriptor, to obtain a plurality of candidate area descriptors.

In embodiments of this application, a distance between the to-be-retrieved area descriptor and each area descriptor in the plurality of area descriptors may be calculated. The distance may include a Hamming distance, a Manhattan distance, a Euclidean distance, or the like. Then, at least one area descriptor that satisfies a condition (for example, the distance is less than a threshold) is selected as a candidate area descriptor.

(4) Matching is separately performed between the to-be-retrieved 3D map point descriptor and 3D map point descriptors corresponding to a plurality of candidate area descriptors. The matching is to separately calculate a similarity between the to-be-retrieved 3D map point descriptor and the 3D map point descriptors corresponding to the plurality of candidate area descriptors, to find a most similar 3D map point.

(5) The pose of the electronic device is calculated based on the found 3D map point by using a pose solution algorithm such as perspective-n-point (PnP) camera pose estimation and efficient perspective-n-point camera pose estimation (EPnP).

The embodiments shown in FIG. 4*a* to FIG. 4*f* are all related to compression of the 3D map. Embodiments of this application provide a plurality of apparatus frameworks for performing the foregoing compression. The following describes the plurality of apparatus frameworks.

Figure 4G:
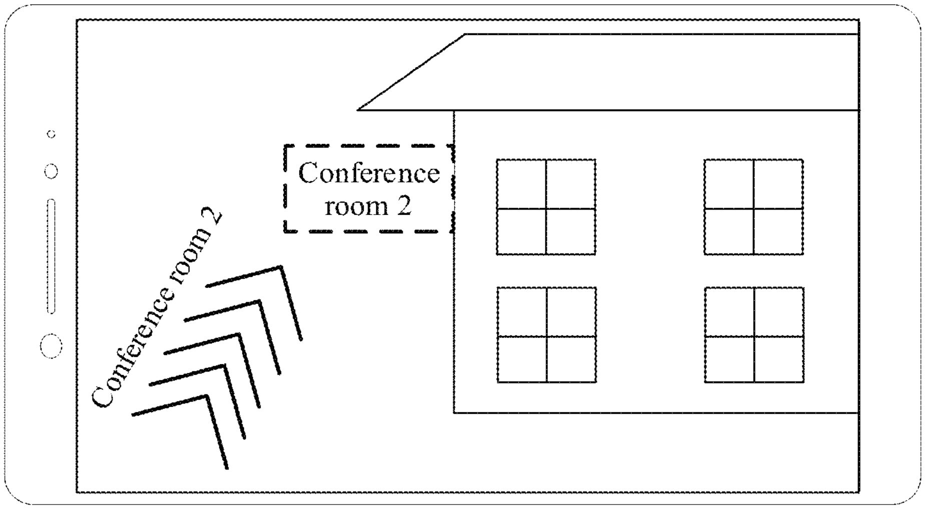
FIG. 4*g* is a schematic diagram of a user interface displayed by an electronic device according to an embodiment of this application.

In any one of the application scenarios in FIG. 4*a* to FIG. 4*f*, positioning is performed based on the 3D map in embodiments of this application, to obtain the current pose of the electronic device. The pose may be applied to fields such as AR navigation, AR human-computer interaction, assisted driving, and autonomous driving. For example, AR navigation based on the pose is used as an example. FIG. 4*g* is a schematic diagram of a user interface displayed by an electronic device according to an embodiment of this application. The electronic device may display, based on the pose, the user interface shown in FIG. 4*g*. The user interface may include an indication of a navigation arrow headed to a conference room 2, and the indication of the navigation arrow headed to the conference room 2 may be a virtual object obtained from a server based on the pose or obtained locally based on the pose. The user interface may further include visual information collected by a sensor, for example, a building shown in FIG. 4*g*. The user goes to the conference room 2 with reference to the user interface of the electronic device shown in FIG. 4*g*.

It should be noted that reconstructed data, obtained through decompression, of a 3D map in embodiments of this application may also be referred to as reconstructed data of the 3D map.

Figure 5:
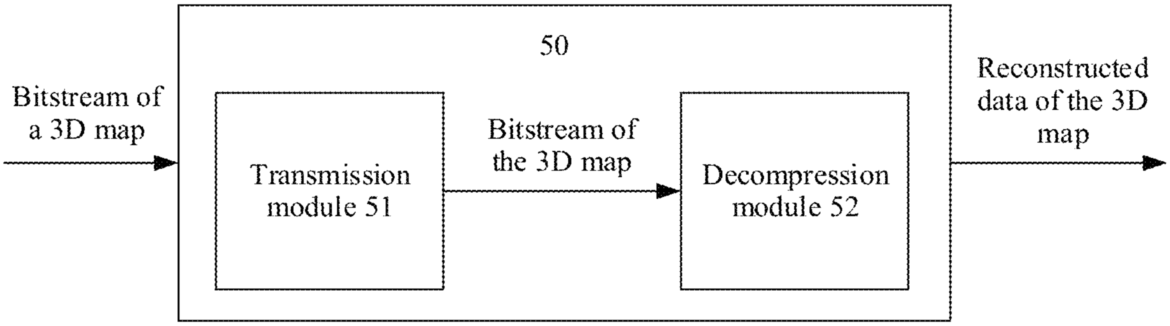
FIG. 5 is a diagram of a structure of an apparatus 50 for decoding a 3D map according to an embodiment of this application.

FIG. 5 is a diagram of a structure of an apparatus 50 for decoding a 3D map according to an embodiment of this application. As shown in FIG. 5, the decoding apparatus 50 may be used in the server or the electronic device in the foregoing embodiments, especially a device that needs to receive and decompress a 3D map, for example, the electronic device in the embodiment shown in FIG. 4*a*, the second electronic device in the embodiments shown in FIG. 4*d* and FIG. 4*f*, or the server in the embodiment shown in FIG. 4*e*.

In this embodiment of this application, the apparatus 50 for decoding a 3D map includes a transmission module 51 and a decompression module 52. The transmission module 51 is configured to receive a bitstream of a 3D map, where the 3D map includes a plurality of 3D map points. The decompression module 52 is configured to decompress the bitstream of the 3D map to obtain reconstructed data of the 3D map, where the reconstructed data of the 3D map includes reconstructed data of the plurality of 3D map points. It can be learned that data of the transmission module 51 is the bitstream of the 3D map, and the decompression module 52 is configured to decompress the bitstream of the 3D map to obtain the reconstructed data of the 3D map.

The decompression module 52 may support decompression of compressed data of the 3D map. In other words, an encoding and decoding system may support compression/decompression of data of the 3D map, to reduce a data volume of the 3D map. In a scenario in which a 3D map needs to be transmitted, transmitting compressed data of the 3D map instead of transmitting original data of the 3D map can reduce a data volume for transmission, for example, can compress the data volume from a TB level to a GB level, and can further reduce bandwidth occupied by the transmission, thereby improving transmission efficiency of the 3D map.

It should be noted that, in this embodiment of this application, the decompression may include at least one of dequantization and prediction.

Quantization means mapping to-be-processed data to one or more quantization indexes, where each quantization index corresponds to one quantization center. A quantity of bits of the quantization index is usually obviously less than a quantity of bits of original data, to save storage or transmission bandwidth. Quantization methods include but are not limited to scalar quantization, vector quantization, product quantization, and the like. Based on this, dequantization is the reverse of the foregoing quantization. To be specific, reconstructed data corresponding to the original data is restored based on the one or more quantization indexes, and a quantity of bits of the reconstructed data is greater than the quantity of bits of the quantization index.

Prediction means performing prediction by using processed data and residual data of the to-be-processed data, to obtain the to-be-processed data. Selection of reference data may be pre-agreed. For example, previously processed data is fixedly used as the reference data, and in this case, the reference data does not need to be identified in the bitstream. For another example, any processed data is used, and in this case, identification information of the reference data needs to be written into the bitstream, and includes a number of the reference data, or other information that can be used to infer the reference data.

In the foregoing description of the data of the 3D map, it can be learned that a sequence of the plurality of 3D map points included in the 3D map is meaningless. Therefore, if a decoder end is related to decompression or decoding of the 3D map point, the sequence of the plurality of 3D map points is not limited. Decompression or decoding may be performed on the plurality of 3D map points based on a sequence of the bitstream.

In addition, on an encoder end, processing of the data of the 3D map includes encapsulation, to encapsulate to-be-encoded data into a bitstream. The encapsulation may use any encoding algorithm, for example, entropy encoding. Entropy encoding is a lossless data compression method. Entropy encoding algorithms include but are not limited to: Huffman (huffman) encoding, arithmetic encoding, a compression/decompression algorithm improved based on an LZ77 compression algorithm (lempel-ziv-markov chain-algorithm, LZMA), a function library algorithm for data compression (zlib), and the like. Correspondingly, on the decoder end, the decompression may further include decapsulation, to decapsulate the bitstream into to-be-decompressed data. The decapsulation may use a decoding algorithm corresponding to an encoding algorithm used by the encoder end, for example, entropy decoding.

It should be understood that, because quantization is a lossy compression manner, data of the 3D map obtained after decompression by the decoder end is not completely the same as original data of the 3D map before compression is performed by the encoder end. Based on this, in this embodiment of this application, data that is of the 3D map and that is output by the decompression module 52 may be referred to as reconstructed data of the 3D map. For the reconstructed data of the 3D map, refer to the foregoing description of the data of the 3D map. Details are not described herein again.

Based on the embodiment shown in FIG. 5, embodiments of this application provide examples of a plurality of implementable structures of the decompression module, and the following embodiments are used for description.

Figure 6A:
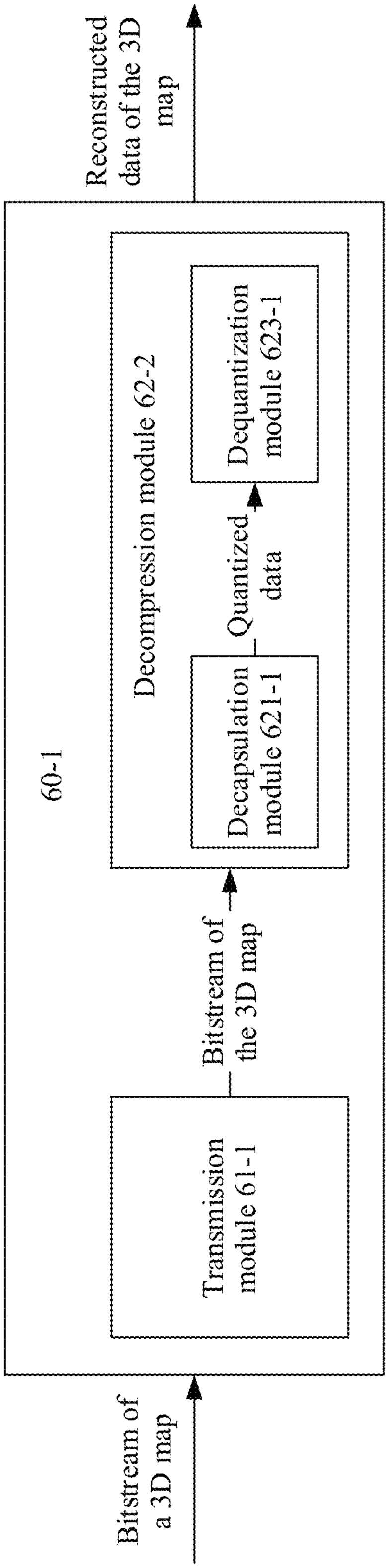
FIG. 6*a* is a diagram of a structure of an apparatus 60 for decoding a 3D map according to an embodiment of this application.

In a possible implementation, FIG. 6*a* is a diagram of a structure of an apparatus 60-1 for decoding a 3D map according to an embodiment of this application. As shown in FIG. 6*a*, the decoding apparatus 60-1 may be used in the server or the electronic device in the foregoing embodiment, especially a device that needs to receive and decompress a 3D map, for example, the electronic device in the embodiment shown in FIG. 4*a*, the second electronic device in the embodiments shown in FIG. 4*d* and FIG. 4*f*, or the server in the embodiment shown in FIG. 4*e*.

With reference to the embodiment shown in FIG. 5, in this embodiment of this application, the decoding apparatus 60-1 includes a transmission module 61-1 and a decompression module 62-1. The decompression module 62-1 includes a decapsulation module 621-1 and a dequantization module 623-1. Details are as follows.

The decapsulation module 621-1 is configured to process an input bitstream of the 3D map to output first data. The dequantization module 623-1 is configured to perform dequantization on input third data to output dequantized data of the third data.

The foregoing first data is the third data, and the dequantized data of the third data is the reconstructed data of the 3D map. It can be learned that input data of the decapsulation module 621-1 is the bitstream of the 3D map, and output data is quantized data of the 3D map; and input data of the dequantization module 623-1 is the quantized data of the 3D map output by the decapsulation module 621-1, and output data is the reconstructed data of the 3D map.

Figure 6B:
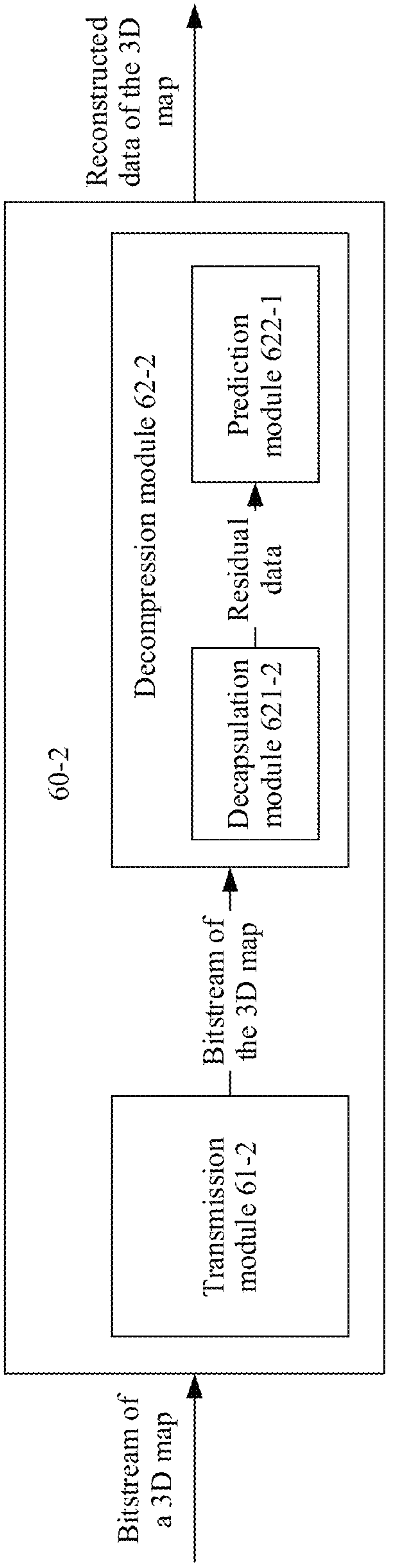
FIG. 6*b* is a diagram of a structure of an apparatus 60 for decoding a 3D map according to an embodiment of this application.

In a possible implementation, FIG. 6*b* is a diagram of a structure of an apparatus 60-2 for decoding a 3D map according to an embodiment of this application. As shown in FIG. 6*b*, the decoding apparatus 60-2 may be used in the server or the electronic device in the foregoing embodiment, especially a device that needs to receive and decompress a 3D map, for example, the electronic device in the embodiment shown in FIG. 4*a*, the second electronic device in the embodiments shown in FIG. 4*d* and FIG. 4*f*, or the server in the embodiment shown in FIG. 4*e*.

With reference to the embodiment shown in FIG. 5, in this embodiment of this application, the decoding apparatus 60-2 includes a transmission module 61-2 and a decompression module 62-2. The decompression module 62-2 includes a decapsulation module 621-2 and a prediction module 622-1. Details are as follows.

The decapsulation module 621-2 is configured to process an input bitstream of the 3D map to output first data. The prediction module 622-1 is configured to perform prediction on residual data of input second data to output the second data.

The first data is the residual data of the second data, and the second data is the reconstructed data of the 3D map. It can be learned that input data of the decapsulation module 621-2 is the bitstream of the 3D map, and output data is residual data of the 3D map; and input data of the prediction module 622-1 is residual data of the 3D map output by the decapsulation module 621-2, and output data is the reconstructed data of the 3D map.

Figure 6C:
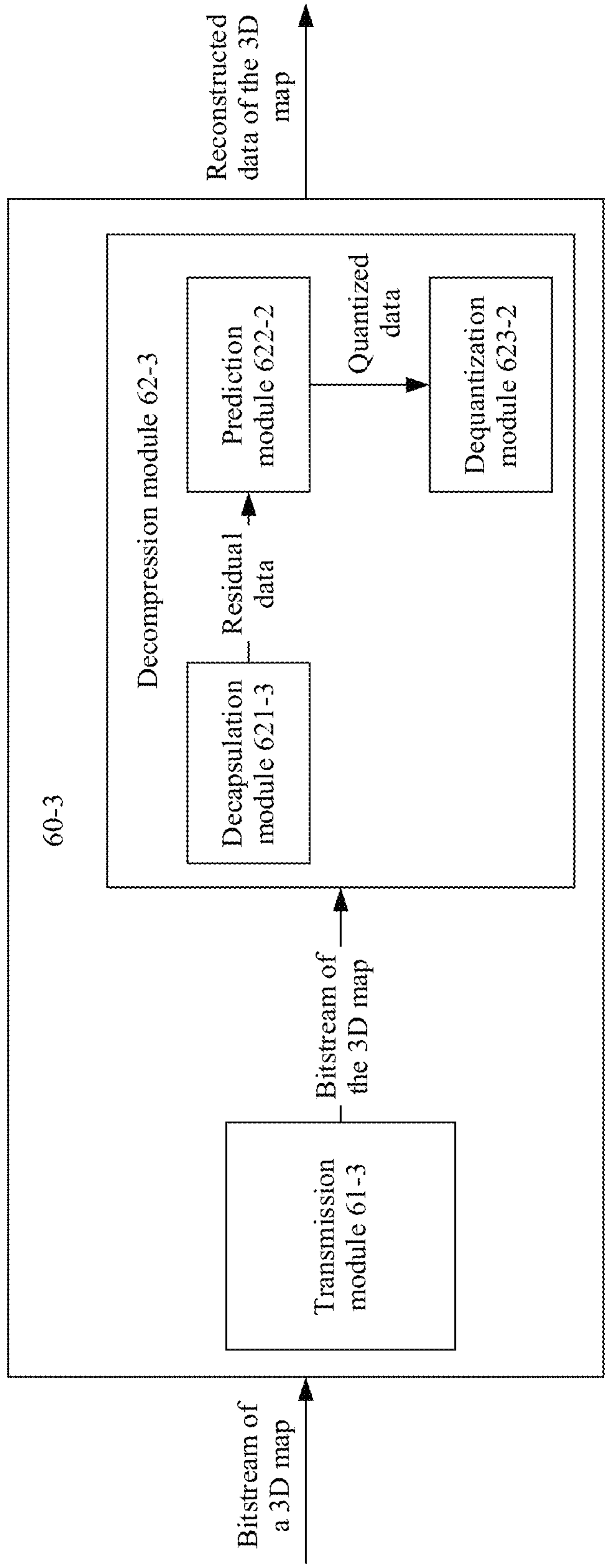
FIG. 6*c* is a diagram of a structure of an apparatus 60 for decoding a 3D map according to an embodiment of this application.

In a possible implementation, FIG. 6*c* is a diagram of a structure of an apparatus 60-3 for decoding a 3D map according to an embodiment of this application. As shown in FIG. 6*c*, the decoding apparatus 60-3 may be used in the server or the electronic device in the foregoing embodiment, especially a device that needs to receive and decompress a 3D map, for example, the electronic device in the embodiment shown in FIG. 4*a*, the second electronic device in the embodiments shown in FIG. 4*d* and FIG. 4*f*, or the server in the embodiment shown in FIG. 4*e*.

With reference to the embodiment shown in FIG. 5, in this embodiment of this application, the decoding apparatus 60-3 includes a transmission module 61-3 and a decompression module 62-3. The decompression module 61-3 includes a decapsulation module 621-3, a prediction module 622-2, and a dequantization module 623-2, Details are as follows.

The decapsulation module 621-3 is configured to process an input bitstream of the 3D map to output first data. The prediction module 622-2 is configured to perform prediction on residual data of input second data to output the second data. The dequantization module 623-2 is configured to perform dequantization on input third data to output dequantized data of the third data.

The first data is the residual data of the second data or the third data, the second data is the reconstructed data of the 3D map or the third data, and the dequantized data of the third data is the reconstructed data of the 3D map. It can be learned that input data of the decapsulation module 621-3 is the bitstream of the 3D map, and output data is residual data of the 3D map; input data of the prediction module 622-2 is residual data of the 3D map output by the decapsulation module 621-3, and output data is quantized data of the 3D map; and input data of the dequantization module 623-2 is the quantized data of the 3D map output by the prediction module 622-2, and output data is the reconstructed data of the 3D map.

According to the foregoing description of the data of the 3D map, the reconstructed data of the 3D map may include reconstructed data of a plurality of area descriptors and reconstructed data of a plurality of 3D map points. Therefore, in the embodiments shown in FIG. 6*a* to FIG. 6*c*, another module different from the decapsulation module in the decompression module may be split into a first module configured to process the area descriptor and a second module configured to process data of the 3D map point. For example, the dequantization module may include a first dequantization module and a second dequantization module, and the prediction module may include a first prediction module and a second prediction module. A difference of the first module and the second module obtained after the differentiation from the foregoing embodiment lies in that input data of the first module and input data of the second module respectively correspond to the area descriptor and the data of the 3D map point.

Figure 6D:
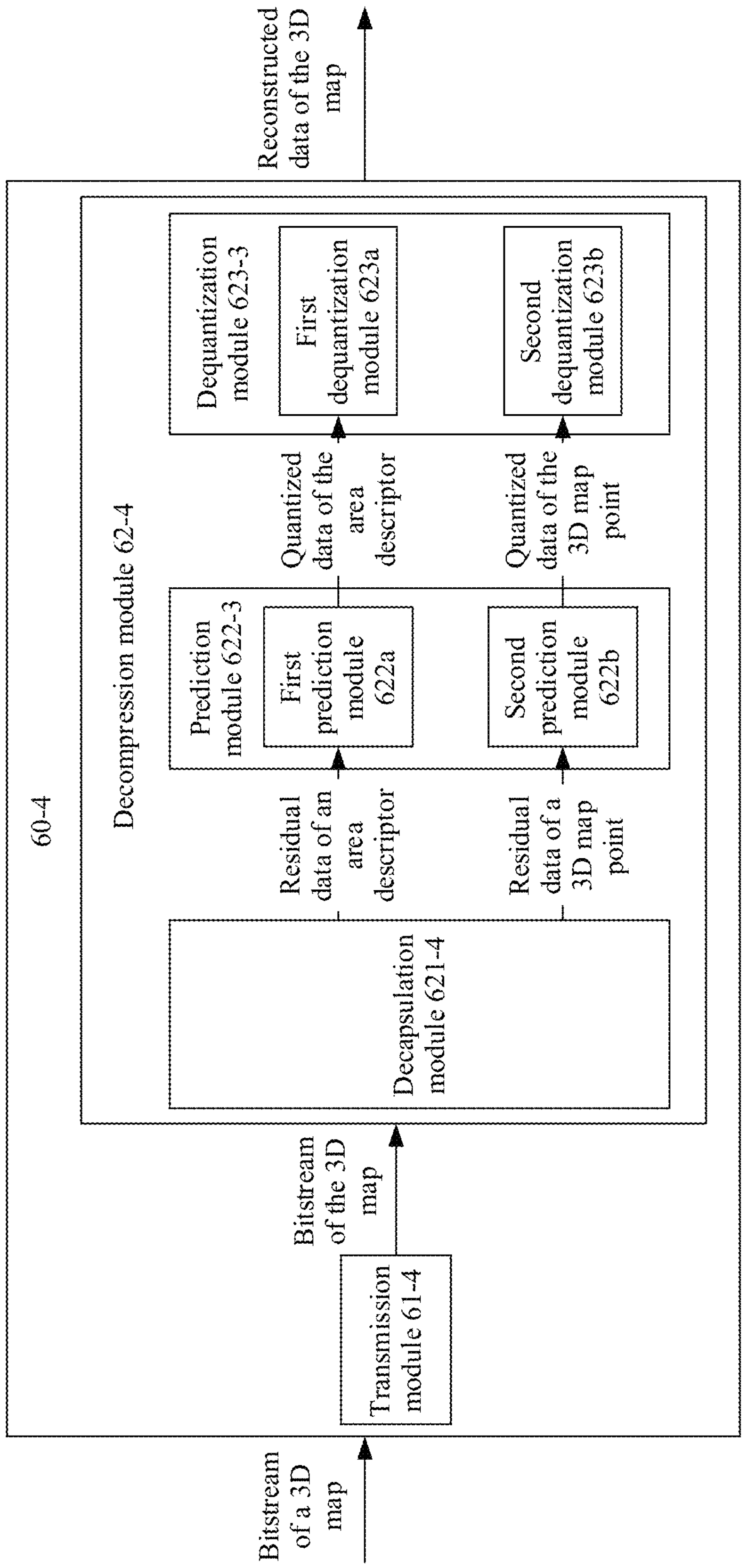
FIG. 6*d* is a diagram of a structure of an apparatus 60 for decoding a 3D map according to an embodiment of this application.

FIG. 6*d* is a diagram of a structure of an apparatus 60-4 for decoding a 3D map according to an embodiment of this application. As shown in FIG. 6*d*, the decoding apparatus 60-4 may be used in the server or the electronic device in the foregoing embodiments, especially a device that needs to receive and decompress a 3D map, for example, the electronic device in the embodiment shown in FIG. 4*a*, the second electronic device in the embodiments shown in FIG. 4*d* and FIG. 4*f*, or the server in the embodiment shown in FIG. 4*e*.

With reference to the embodiment shown in FIG. 6*c*, in this embodiment of this application, the decoding apparatus 60-4 includes a transmission module 61-4 and a decompression module 62-4. The decompression module 62-4 includes a decapsulation module 621-4, a prediction module 622-3, and a dequantization module 623-3. The prediction module 622-3 includes a first prediction module 622*a* and a second prediction module 622*b*. The dequantization module 623 includes a first dequantization module 623*a* and a second dequantization module 623*b*.

The transmission module 61-4 is configured to receive a bitstream of the 3D map.

Input data of the decapsulation module 621-4 is the bitstream of the 3D map, and the decapsulation module 621-4 performs decapsulation on the bitstream of the 3D map to obtain residual data of the area descriptor and residual data of the 3D map point. Input data of the first prediction module 622*a* is the residual data of the area descriptor, and output data is quantized data of the area descriptor. Input data of the first dequantization module 623*a* is the quantized data of the area descriptor, and output data is reconstructed data of the area descriptor. Input data of the second prediction module 622*b* is the residual data of the 3D map point, and output data is quantized data of the 3D map point. Input data of the second dequantization module 623*b* is quantized data of the 3D map point, and output data is reconstructed data of the 3D map point.

According to the foregoing description of the data of the 3D map, the reconstructed data of the 3D map may include reconstructed data of a plurality of area descriptors, and reconstructed data of 3D map point descriptors and reconstructed data of 3D map point spatial locations of a plurality of 3D map points. Therefore, in the embodiments shown in FIG. 6*a* to FIG. 6*c*, another module different from the decapsulation module in the decompression module may be split into a first module configured to process the area descriptor, a second module configured to process the 3D map point descriptor, and a third module configured to process the 3D map point spatial location. For example, the dequantization module may include a first dequantization module, a second dequantization module, and a third dequantization module, and the prediction module may include a first prediction module, a second prediction module, and a third prediction module. A difference of the first module, the second module, and the third module obtained after the differentiation from the foregoing embodiment lies in that input data of the first module, input data of the second module, and input data of the third module respectively correspond to the area descriptor, the 3D map point descriptor, and the 3D map point spatial location.

Figure 6E:
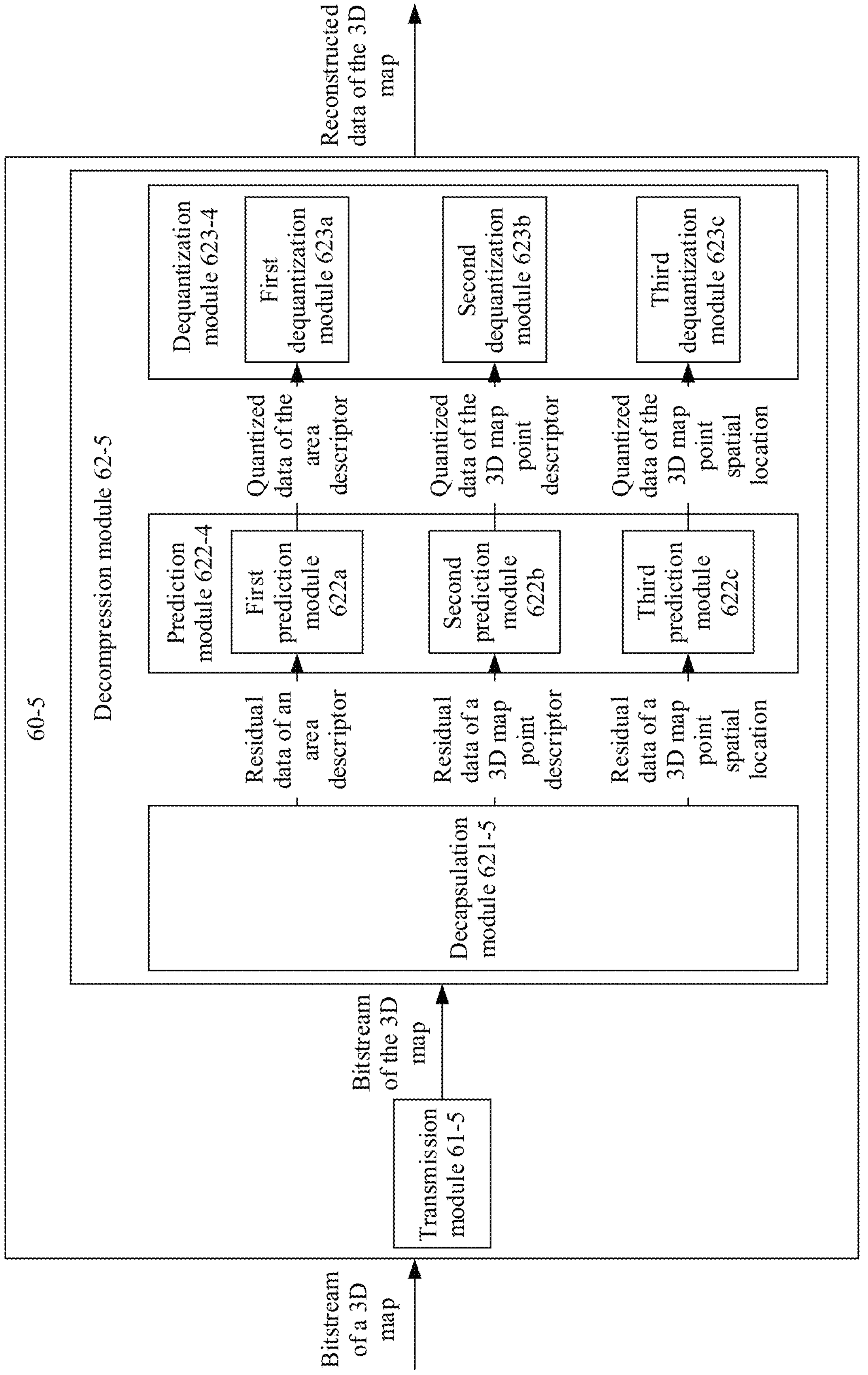
FIG. 6*e* is a diagram of a structure of an apparatus 60 for decoding a 3D map according to an embodiment of this application.

FIG. 6*e* is a diagram of a structure of an apparatus 60 for decoding a 3D map according to an embodiment of this application. As shown in FIG. 6*e*, the decoding apparatus 60 may be used in the server or the electronic device in the foregoing embodiments, especially a device that needs to receive and decompress a 3D map, for example, the electronic device in the embodiment shown in FIG. 4*a*, the second electronic device in the embodiments shown in FIG. 4*d* and FIG. 4*f*, or the server in the embodiment shown in FIG. 4*e*.

With reference to the embodiment shown in FIG. 6*c*, in this embodiment of this application, the decoding apparatus 60-5 includes a transmission module 61-5 and a decompression module 62-5. The decompression module 62-5 include: a decapsulation module 621-5, a prediction module 622-4, and a dequantization module 623-4. The prediction module 622-4 includes a first prediction module 622*a*, a second prediction module 622*b*, and a third prediction module 622*c*. The dequantization module 623-4 includes a first dequantization module 623*a*, a second dequantization module 623*b*, and a third dequantization module 623*c*.

The transmission module 61-5 is configured to receive a bitstream of the 3D map.

Input data of the decapsulation module 621-5 is the bitstream of the 3D map, and the decapsulation module 621-5 performs decapsulation on the bitstream of the 3D map to obtain residual data of the area descriptor, residual data of the 3D map point descriptor, and residual data of the 3D map point spatial location. Input data of the first prediction module 622*a* is the residual data of the area descriptor, and output data is quantized data of the area descriptor. Input data of the first dequantization module 623*a* is the quantized data of the area descriptor, and output data is reconstructed data of the area descriptor. Input data of the second prediction module 622*b* is the residual data of the 3D map point descriptor, and output data is quantized data of the 3D map point descriptor. Input data of the second dequantization module 623*b* is the quantized data of the 3D map point descriptor, and output data is reconstructed data of the 3D map point descriptor. Input data of the third prediction module 622*c* is the residual data of the 3D map point spatial location, and output data is quantized data of the 3D map point spatial location. Input data of the third dequantization module 623*c* is the quantized data of the 3D map point spatial location, and output data is reconstructed data of the 3D map point spatial location.

It should be noted that FIG. 6*d* and FIG. 6*e* respectively show example structures of an apparatus for decoding a 3D map, and the structure is a structure obtained based on content included in the bitstream of the 3D map. However, the structure does not constitute a limitation on the decoding apparatus. The decoding apparatus may include modules more diversified than those in the embodiment shown in FIG. 6*d* or FIG. 6*e*. For example, with reference to the embodiment shown in FIG. 6*a* or FIG. 6*b*, another structure is obtained based on content included in the bitstream of the 3D map. In the embodiments shown in FIG. 6*a* to FIG. 6*c*, the prediction module and the dequantization module are in an "and/or" relationship, that is, the decompression module may include one of the prediction module and the dequantization module, or may include both the prediction module and the dequantization module. Therefore, when distinguishing is made between the first module and the second module, processing methods may be independently set for a module for processing an area descriptor and a module for processing data of a 3D map point, and do not need to be completely consistent. For example, the area descriptor may be processed by using the first prediction module and the first dequantization module, and the data of the 3D map point may be processed by using the second prediction module. When distinguishing is made between the first module, the second module, and the third module, processing methods may be independently set for a module for processing an area descriptor, a module for processing a 3D map point descriptor, and a module for processing a 3D map point spatial location, and do not need to be completely consistent. For example, the area descriptor may be processed by using the first prediction module and the first dequantization module, the 3D map point descriptor may be processed by using the second prediction module, and the 3D map point spatial location may be processed by using the third dequantization module. A specific implementation of the decompression module is not specifically limited in this application.

According to the foregoing description of the data of the 3D map, the reconstructed data of the 3D map may include reconstructed data of a plurality of area descriptors and reconstructed data of a plurality of 3D map points.

Figure 7A:
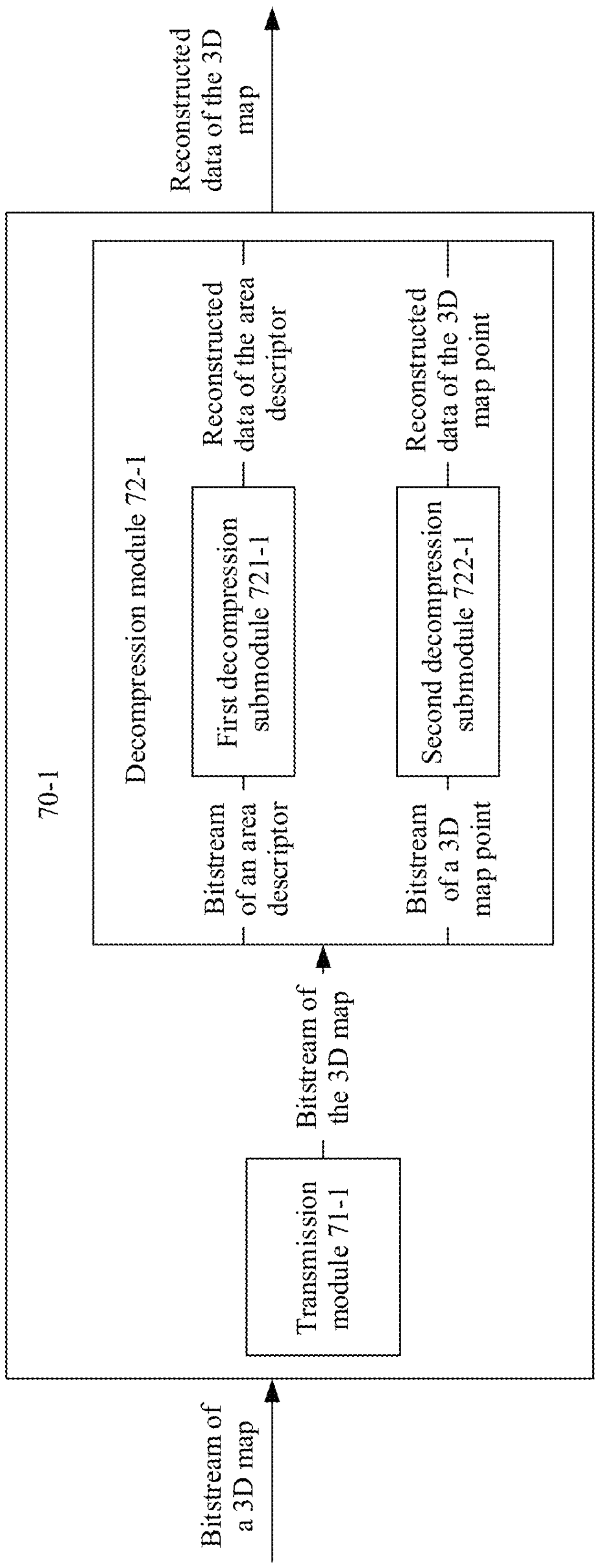
FIG. 7*a* is a diagram of a structure of an apparatus 70 for decoding a 3D map according to an embodiment of this application.

In a possible implementation, FIG. 7*a* is a diagram of a structure of an apparatus 70-1 for decoding a 3D map according to an embodiment of this application. As shown in FIG. 7*a*, the decoding apparatus 70-1 may be used in the server or the electronic device in the foregoing embodiment, especially a device that needs to receive and decompress a 3D map, for example, the electronic device in the embodiment shown in FIG. 4*a*, the second electronic device in the embodiments shown in FIG. 4*d* and FIG. 4*f*, or the server in the embodiment shown in FIG. 4*e*.

With reference to the embodiment shown in FIG. 5, in this embodiment of this application, the decoding apparatus 70-1 includes a transmission module 71-1 and a decompression module 72-1. The decompression module 72-1 includes a first decompression submodule 721-1 and a second decompression submodule 722-1. Details are as follows.

The first decompression submodule 721-1 is configured to decompress an input bitstream of fourteenth data to output the fourteenth data. The second decompression submodule 722-1 is configured to compress an input bitstream of fifteenth data to output the fifteenth data.

The fourteenth data is reconstructed data of one of the plurality of area descriptors, and the fifteenth data is reconstructed data of one of the plurality of 3D map points. It can be learned that input data of the first decompression submodule 721-1 is a bitstream of an area descriptor, output data is reconstructed data of the area descriptor; and input data of the second decompression submodule 722-1 is a bitstream of a 3D map point, and output data is reconstructed data of the 3D map point. A bitstream of a 3D map includes a bitstream of a plurality of area descriptors and a bitstream of a plurality of 3D map points.

For the first decompression submodule 721-1 and the second decompression submodule 722-1, refer to the structure of the decompression module in the embodiments shown in FIG. 6*a* to FIG. 6*e*. It should be noted that the first decompression submodule 721-1 and the second decompression submodule 722-1 are independent of each other, and may use same structures or different structures. That is, the first decompression submodule 721-1 configured to process the area descriptor and the second decompression submodule 722-1 configured to process data of the 3D map point may be of same structures or different structures. Correspondingly, a step of decompression performed on the area descriptor may also be the same as or different from a step of decompression performed on the data of the 3D map point.

For example, the first decompression submodule includes a first decapsulation module and a first prediction module. In this way, after the bitstream of the area descriptor is input to the first decompression submodule, the first decapsulation module first decapsulates the bitstream to obtain residual data of the area descriptor, and then the first prediction module processes the residual data to obtain reconstructed data of the area descriptor. The second decompression submodule includes a second decapsulation module, a second prediction module, and a second dequantization module. In this way, after the bitstream of the 3D map point is input to the second decompression submodule, the second decapsulation module first processes the bitstream to obtain residual data of the 3D map point, then the second prediction module processes the residual data to obtain quantized data of the 3D map point, and then the second dequantization module processes the quantized data to obtain reconstructed data of the 3D map point.

For another example, the first decompression submodule includes a first decapsulation module, a first prediction module, and a first dequantization module. In this way, after the bitstream of the area descriptor is input to the first decompression submodule, the first decapsulation module first processes the bitstream to obtain residual data of the area descriptor, the first prediction module processes the residual data to obtain quantized data of the area descriptor, and the first dequantization module processes the quantized data to obtain reconstructed data of the area descriptor. The second decompression submodule includes a second decapsulation module and a second prediction module. In this way, after the bitstream of the 3D map point is input into the second decompression submodule, the second decapsulation module processes the description to obtain residual data of the 3D map point, and the second prediction module processes the residual data to obtain reconstructed data of the 3D map point.

It should be understood that the structures of the first decompression submodule and the second decompression submodule are described above as an example. However, this does not constitute a limitation on the structures of the first decompression submodule and the second decompression submodule. The two submodules may include more or fewer modules than those in the example. For details, refer to the structures of the decompression module in the embodiments shown in FIG. 6*a* to FIG. 6*e*. This is not specifically limited in embodiments of this application.

Figure 7B:
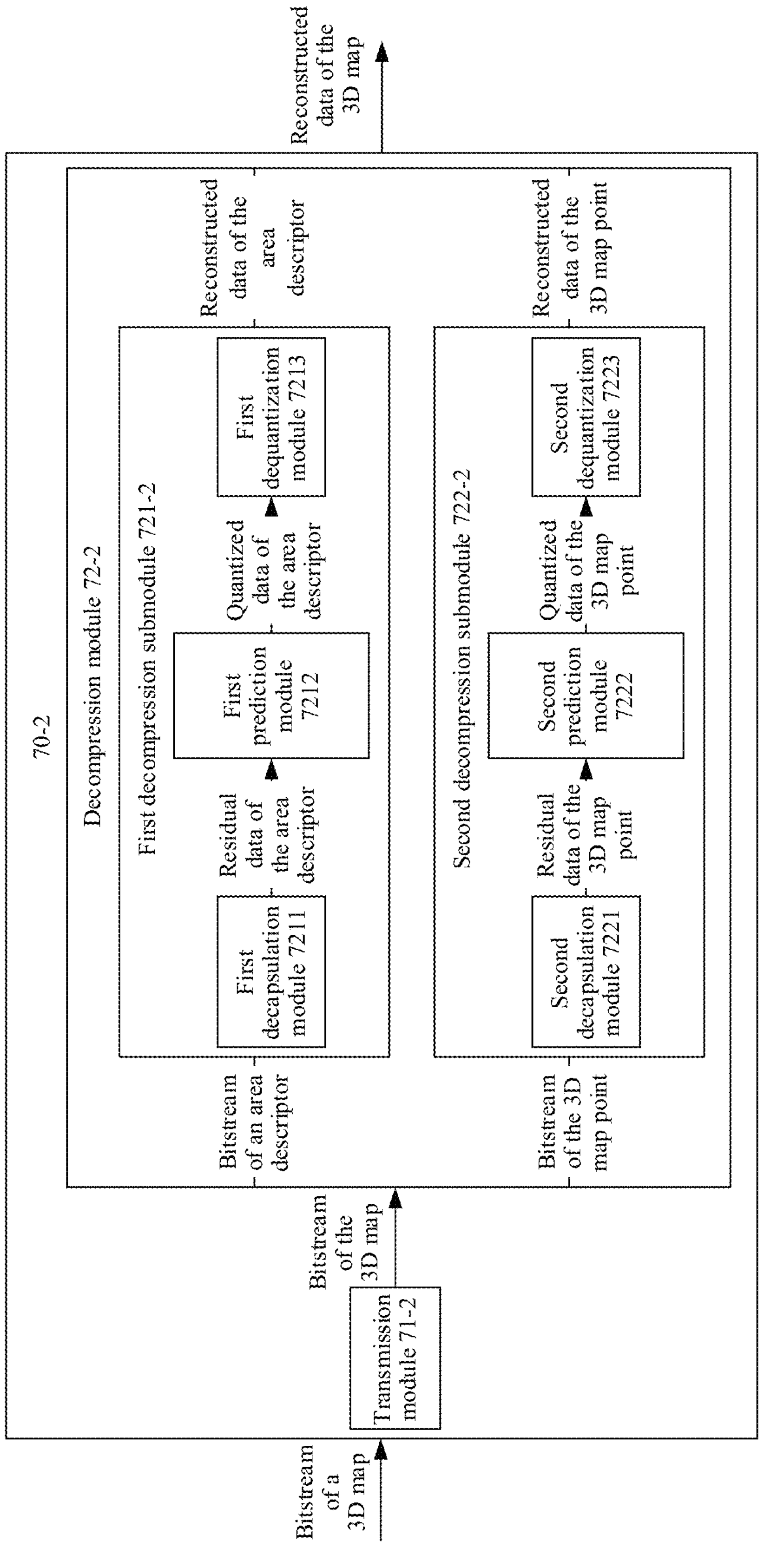
FIG. 7*b* is a diagram of a structure of an apparatus 70 for decoding a 3D map according to an embodiment of this application.

In a possible implementation, FIG. 7*b* is a diagram of a structure of an apparatus 70-2 for decoding a 3D map according to an embodiment of this application. As shown in FIG. 7*b*, the decoding apparatus 70-2 may be used in the server or the electronic device in the foregoing embodiment, especially a device that needs to receive and decompress a 3D map, for example, the electronic device in the embodiment shown in FIG. 4*a*, the second electronic device in the embodiments shown in FIG. 4*d* and FIG. 4*f*, or the server in the embodiment shown in FIG. 4*e*.

With reference to the embodiment shown in FIG. 7*a*, in this embodiment of this application, the decoding apparatus 70-2 includes a transmission module 71-2 and a decompression module 72-2. The decompression module 72-2 includes a first decompression submodule 721-2 and a second decompression submodule 722-2. The first decompression submodule 721-2 includes a first decapsulation module 7211, a first prediction module 7212, and a first dequantization module 7213. The second decompression submodule 722-2 includes a second decapsulation module 7221, a second prediction module 7222, and a second dequantization module 7223. Details are as follows.

The first decapsulation module 7211 is configured to process an input bitstream of an area descriptor to obtain residual data of the area descriptor. The first prediction module 7212 is configured to perform prediction on the input residual data of the area descriptor to obtain quantized data of the area descriptor. The first dequantization module 7213 is configured to perform dequantization on the input quantized data of the area descriptor to obtain reconstructed data of the area descriptor. The second decapsulation module 7221 is configured to process an input bitstream of a 3D map point to obtain residual data of the 3D map point. The second prediction module 7222 is configured to perform prediction on the input residual data of the 3D map point to obtain quantized data of the 3D map point. The second dequantization module 7223 is configured to perform dequantization on the input quantized data of the 3D map point to obtain reconstructed data of the 3D map point.

It should be understood that the structures of the first decompression submodule and the second decompression submodule are described as an example in the embodiment shown in FIG. 7*b*. However, this does not constitute a limitation on the structures of the first decompression submodule and the second decompression submodule. The two submodules may include more or fewer modules than those in the example. For details, refer to the structures of the decompression module 62 in the embodiments shown in FIG. 6*a* to FIG. 6*e*. This is not specifically limited in embodiments of this application.

According to the foregoing description of the data of the 3D map, the reconstructed data of the 3D map may include reconstructed data of a plurality of area descriptors, reconstructed data of 3D map point descriptors, and reconstructed data of 3D map point spatial locations of a plurality of 3D map points.

Figure 8A:
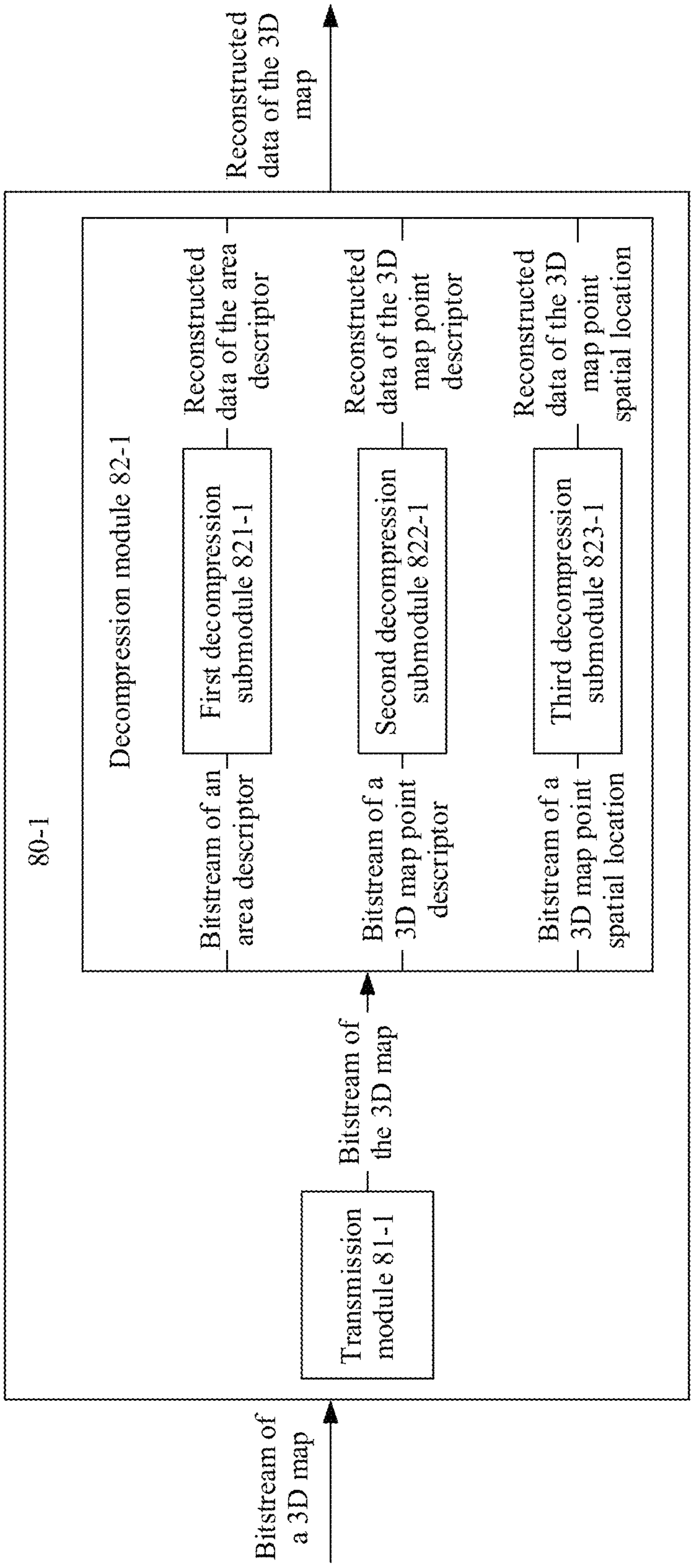
FIG. 8*a* is a diagram of a structure of an apparatus 80 for decoding a 3D map according to an embodiment of this application.

In a possible implementation, FIG. 8*a* is a diagram of a structure of an apparatus 80-1 for decoding a 3D map according to an embodiment of this application. As shown in FIG. 8*a*, the decoding apparatus 80-1 may be used in the server or the electronic device in the foregoing embodiment, especially a device that needs to receive and decompress a 3D map, for example, the electronic device in the embodiment shown in FIG. 4*a*, the second electronic device in the embodiments shown in FIG. 4*d* and FIG. 4*f*, or the server in the embodiment shown in FIG. 4*e*.

With reference to the embodiment shown in FIG. 5, in this embodiment of this application, the decoding apparatus 80-1 includes a transmission module 81-1 and a decompression module 82-1. The decompression module 82-1 includes a first decompression submodule 821-1, a second decompression submodule 822-1, and a third decompression submodule 823-1. Details are as follows.

The first decompression submodule 821-1 is configured to decompress an input bitstream of twenty-second data to output the twenty-second data. The second decompression submodule 822-1 is configured to compress an input bitstream of twenty-third data to output the twenty-third data. The third decompression submodule 823-1 is configured to compress an input bitstream of twenty-fourth data to output the twenty-fourth data.

The twenty-second data is reconstructed data of one of the plurality of area descriptors, the twenty-third data is reconstructed data of a 3D map point descriptor of one of the plurality of 3D map points, and the twenty-fourth data is reconstructed data of a 3D map point spatial location of one of the plurality of 3D map points. It can be learned that input data of the first decompression submodule 821-1 is a bitstream of an area descriptor, output data is reconstructed data of the area descriptor; input data of the second decompression submodule 812-1 is a bitstream of a 3D map point descriptor, and output data is reconstructed data of the 3D map point descriptor; and input data of the third decompression submodule 813-1 is a bitstream of a 3D map point spatial location, and output data is reconstructed data of the 3D map point spatial location. A bitstream of a 3D map includes a bitstream of a plurality of area descriptors, a bitstream of a plurality of 3D map point descriptors, and a bitstream of a plurality of 3D map point spatial locations.

For the first decompression submodule 821-1, the second decompression submodule 822-1, and the third decompression submodule 823-1, refer to the structure of the decompression module in the embodiments shown in FIG. 6*a* to FIG. 6*e*. It should be noted that the first decompression submodule 821-1, the second decompression submodule 822-1, and the third decompression submodule 823-1 are independent of each other, and may use same structures or different structures. That is, the first decompression submodule 821-1 configured to process the area descriptor, the second decompression submodule 822-1 configured to process the 3D map point descriptor, and the third decompression submodule 823-1 configured to process the 3D map point spatial location are of same structures or different structures. Correspondingly, a step of decompression performed on the area descriptor, a step of decompression performed on the 3D map point descriptor, and a step of decompression performed on the 3D map point spatial location may also be the same or different.

Figure 8B:
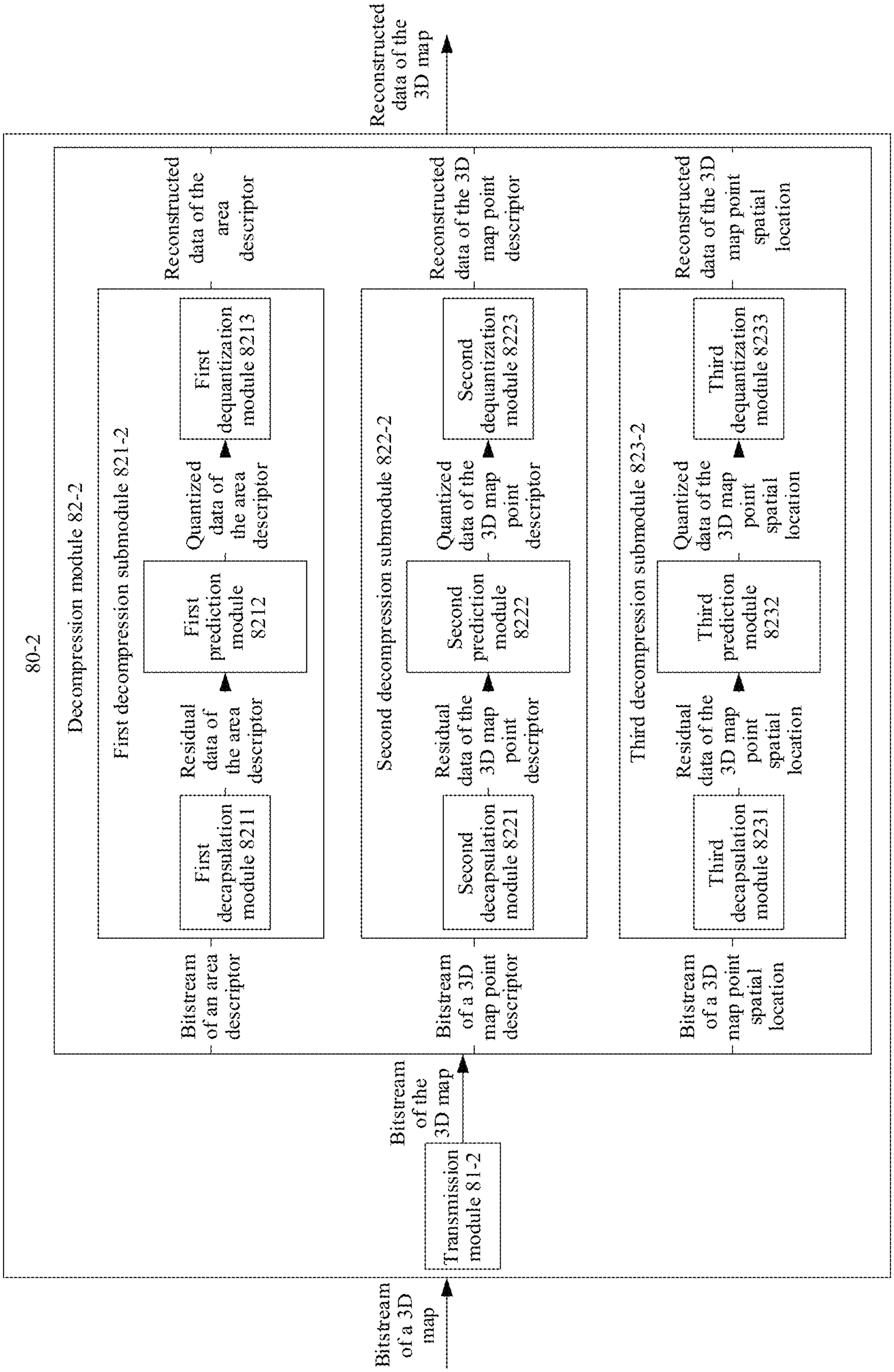
FIG. 8*b* is a diagram of a structure of an apparatus 80 for decoding a 3D map according to an embodiment of this application.

In a possible implementation, FIG. 8*b* is a diagram of a structure of an apparatus 80-2 for decoding a 3D map according to an embodiment of this application. As shown in FIG. 8*b*, the decoding apparatus 80-2 may be used in the server or the electronic device in the foregoing embodiment, especially a device that needs to receive and decompress a 3D map, for example, the electronic device in the embodiment shown in FIG. 4*a*, the second electronic device in the embodiments shown in FIG. 4*d* and FIG. 4*f*, or the server in the embodiment shown in FIG. 4*e*.

With reference to the embodiment shown in FIG. 8*a*, in this embodiment of this application, the decoding apparatus 80-2 includes a transmission module 81-2 and a decompression module 82-2. The decompression module 82-2 includes a first decompression submodule 821-2, a second decompression submodule 822-2, and a third decompression submodule 823-2. The first decompression submodule 821-2 includes a first decapsulation module 8211, a first prediction module 8212, and a first dequantization module 8213. The second decompression submodule 822-2 includes a second decapsulation module 8221, a second prediction module 8222, and a second dequantization module 8223. The third decompression submodule 823-2 includes a third decapsulation module 8231, a third prediction module 8232, and a third dequantization module 8233. Details are as follows.

The first decapsulation module 8211 is configured to process an input bitstream of an area descriptor to obtain residual data of the area descriptor. The first prediction module 8212 is configured to perform prediction on the input residual data of the area descriptor to obtain quantized data of the area descriptor. The first dequantization module 8213 is configured to perform dequantization on the input quantized data of the area descriptor to obtain reconstructed data of the area descriptor. The second decapsulation module 8221 is configured to process an input bitstream of a 3D map point descriptor to obtain residual data of the 3D map point descriptor. The second prediction module 8222 is configured to perform prediction on the input residual data of the 3D map point descriptor to obtain quantized data of the 3D map point descriptor. The second dequantization module 8223 is configured to perform dequantization on the input quantized data of the 3D map point descriptor to obtain reconstructed data of the 3D map point descriptor. The third decapsulation module 8231 is configured to process an input bitstream of a 3D map point spatial location to obtain residual data of the 3D map point spatial location. The third prediction module 8232 is configured to perform prediction on the input residual data of the 3D map point spatial location to obtain quantized data of the 3D map point spatial location. The third dequantization module 8233 is configured to perform dequantization on the input quantized data of the 3D map point spatial location to obtain reconstructed data of the 3D map point spatial location.

It should be understood that the structures of the first decompression submodule, the second decompression submodule, and the third decompression submodule are described as an example in the embodiment shown in FIG. 8*b*. However, this does not constitute a limitation on the structures of the first decompression submodule, the second decompression submodule, and the third decompression submodule. The three submodules may include more or fewer modules than those in the example. For details, refer to the structures of the decompression module 62 in the embodiments shown in FIG. 6*a* to FIG. 6*e*. This is not specifically limited in embodiments of this application.

Figure 9:
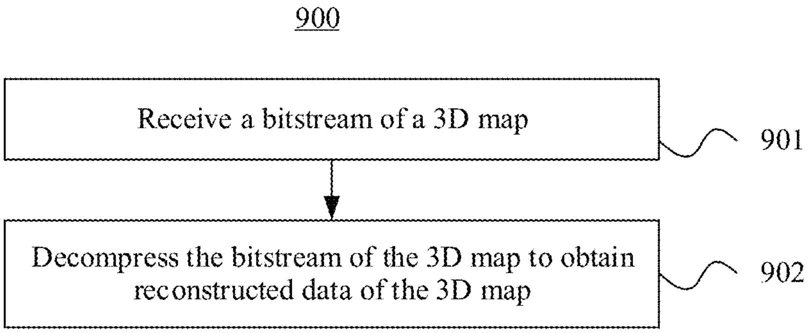
FIG. 9 is a flowchart of a process 900 of a method for decoding a 3D map according to an embodiment of this application.

FIG. 9 is a flowchart of a process 900 of a method for decoding a 3D map according to an embodiment of this application. As shown in FIG. 9, the process 900 may be performed by the decoding apparatus in the foregoing embodiment. The process 900 is described as a series of steps or operations. It should be understood that the steps or operations of the process 900 may be performed in various sequences and/or simultaneously, and are not limited to an execution sequence shown in FIG. 9. It is assumed that a bitstream of a 3D map is decompressed in the decoding apparatus to obtain data of the 3D map, and the process 900 including the following steps is performed to process a bitstream of a 3D map that is currently being processed.

Step 901: Receive a bitstream of a 3D map.

The decoding apparatus may receive the bitstream of the 3D map by using a communication link.

Step 902: Decompress the bitstream of the 3D map to obtain reconstructed data of the 3D map.

For the 3D map and the reconstructed data of the 3D map, refer to the foregoing description. Details are not described herein again.

In this embodiment of this application, decompression performed on the bitstream of the 3D map may include decapsulation, prediction, and/or dequantization. For the foregoing processing, refer to the description in the foregoing embodiment. Details are not described herein again.

Figure 10:
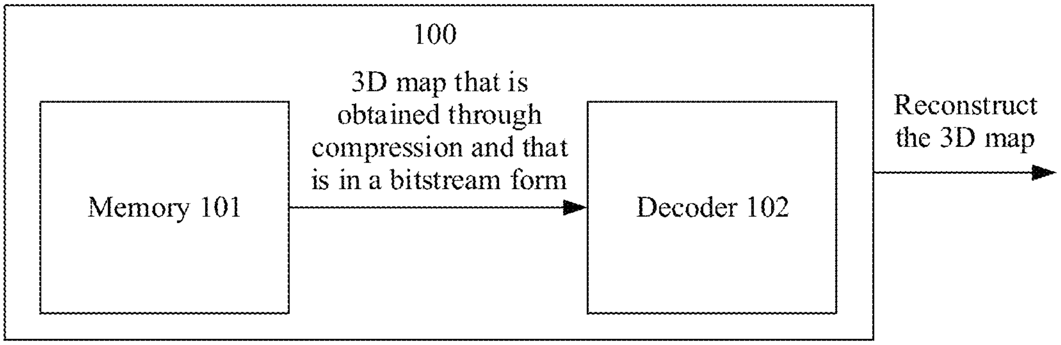
FIG. 10 is a diagram of a structure of an apparatus 100 for decoding a 3D map according to an embodiment of this application.

FIG. 10 is a diagram of a structure of an apparatus 100 for decoding an 3D map according to an embodiment of this application. As shown in FIG. 10, the decoding apparatus 100 may be used in the server or the electronic device in the foregoing embodiment, especially a device that needs to store and decompress a 3D map, for example, the server in the embodiment shown in FIG. 4*b*, or the electronic device in the embodiment shown in FIG. 4*c*.

In this embodiment of this application, the apparatus 100 for decoding a 3D map includes: a memory 101, configured to store a 3D map that is obtained through compression and that is in a bitstream form, where the 3D map includes a plurality of 3D map points, and data of the 3D map includes data of the plurality of 3D map points; and a decoder 102, configured to decompress the 3D map that is obtained through compression and that is in the bitstream form, to obtain a reconstructed 3D map, where the reconstructed 3D map includes the plurality of 3D map points, and data of the reconstructed 3D map includes reconstructed data of the plurality of 3D map points. It can be learned that the memory 101 stores the 3D map that is obtained through compression and that is in the bitstream form, input data of the decoder 102 is the 3D map that is obtained through compression and that is in the bitstream form, and output data is the reconstructed 3D map.

The decoder 102 may support decompression of the 3D map that is obtained through compression and that is in the bitstream form. That is, the apparatus for decoding a 3D map may support compression/decompression of the data of the 3D map, to reduce a data volume of the 3D map. In a scenario in which a 3D map needs to be stored, storing the 3D map that is obtained through compression and that is in the bitstream form instead of storing original data of the 3D map can reduce space occupied by storage of the data of the 3D map.

In this embodiment of this application, for the decoder 102, refer to the decompression module in the embodiments shown in FIG. 5 to FIG. 8*b*. A difference lies in that the decoder does not include a decapsulation module.

Figure 11A:
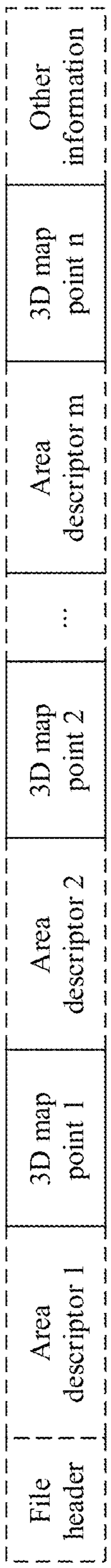
FIG. 11*a* is an example diagram of a structure of an encoded bitstream of a 3D map according to an embodiment of this application.

FIG. 11*a* is an example diagram of a structure of an encoded bitstream of a 3D map according to an embodiment of this application. As shown in FIG. 11*a*, the encoded bitstream of the 3D map may include a file header, an area descriptor 1, a 3D map point 1, an area descriptor 2, a 3D map point 2, . . . , an area descriptor m, a 3D map point n, and other information.

In this embodiment of this application, it is assumed that the 3D map includes m area descriptors and n 3D map points, and area descriptors and 3D map points in the encoded bitstream may be arranged in a cross manner.

Figure 11B:
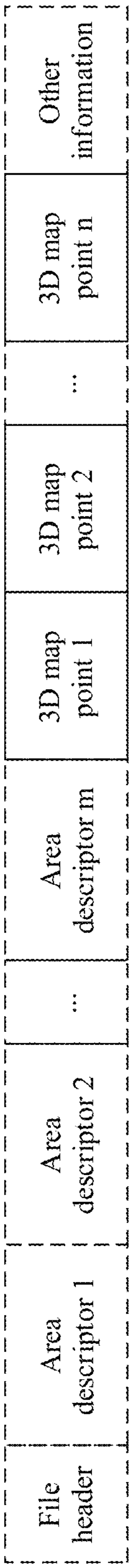
FIG. 11*b* is an example diagram of a structure of an encoded bitstream of a 3D map according to an embodiment of this application.

FIG. 11*b* is an example diagram of a structure of an encoded bitstream of a 3D map according to an embodiment of this application. As shown in FIG. 11*b*, the encoded bitstream of the 3D map may include a file header, an area descriptor 1, an area descriptor 2, . . . , an area descriptor m, a 3D map point 1, a 3D map point 2, . . . , a 3D map point n, and other information.

In this embodiment of this application, it is assumed that the 3D map includes m area descriptors and n 3D map points. Area descriptors and 3D map points in the encoded bitstream are separately arranged: The m area descriptors are followed by the n 3D map points are arranged, or the n 3D map points are followed by the m area descriptors.

It should be understood that the encoded bitstream of the 3D map in this embodiment of this application may alternatively use another structure, and a specific structure is associated with data content included in the 3D map. For example, the encoded bitstream of the 3D map does not include one or more of the file header, the area descriptor, and other information.

Figure 11C:
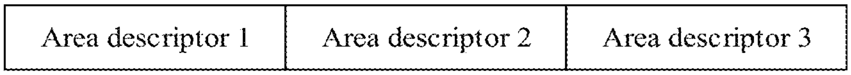
FIG. 11*c* is an example diagram of a structure of an encoded bitstream of a 3D map according to an embodiment of this application.

FIG. 11*c* is an example diagram of a structure of an encoded bitstream of a 3D map according to an embodiment of this application. As shown in FIG. 11*c*, the encoded bitstream of the 3D map may include an area descriptor 1, an area descriptor 2, and an area descriptor 3. The structure of the encoded bitstream corresponds to the foregoing case in which the decompression module does not include a prediction module. Therefore, reference information for prediction does not need to be filled in the bitstream.

Figure 11D:
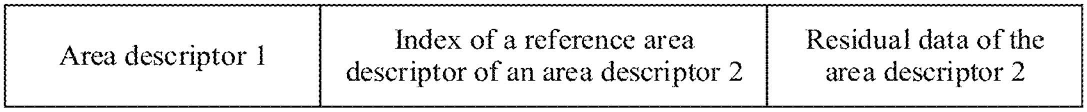
FIG. 11*d* is an example diagram of a structure of an encoded bitstream of a 3D map according to an embodiment of this application.

FIG. 11*d* is an example diagram of a structure of an encoded bitstream of a 3D map according to an embodiment of this application. As shown in FIG. 11*d*, the encoded bitstream of the 3D map may include an area descriptor 1, an index of a reference area descriptor of an area descriptor 2, and residual data of the area descriptor 2. The structure of the encoded bitstream corresponds to the foregoing case in which the decompression module includes a prediction module. Therefore, reference information for prediction needs to be filled in the bitstream, for example, the index of the reference area descriptor of the area descriptor 2. In addition, the residual data of the area descriptor 2 instead of original data is filled in the area descriptor 2.

Figure 11E:
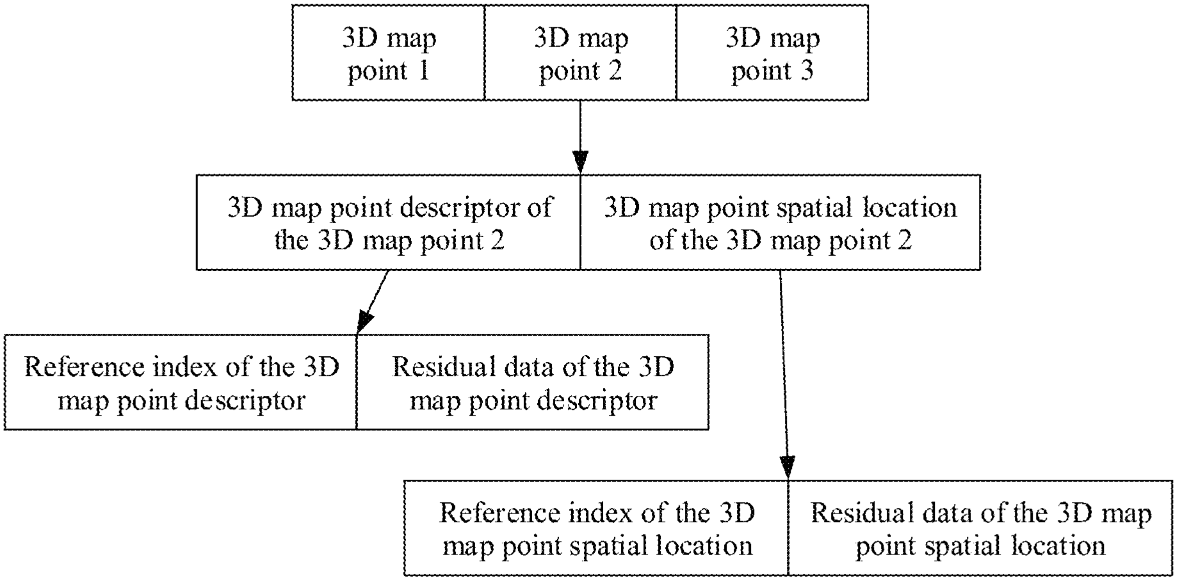
FIG. 11*e* is an example diagram of a structure of an encoded bitstream of a 3D map according to an embodiment of this application.

FIG. 11*e* is an example diagram of a structure of an encoded bitstream of a 3D map according to an embodiment of this application. As shown in FIG. 11*e*, the encoded bitstream of the 3D map may include a 3D map point 1, a 3D map point 2, and a 3D map point 3. The 3D map point 2 is used as an example. A bitstream of the 3D map point 2 includes a 3D map point descriptor of the 3D map point 2 and a 3D map point spatial location of the 3D map point 2. If the structure of the encoded bitstream corresponds to the foregoing case in which the decompression module includes a prediction module, a bitstream of the 3D map point descriptor includes a reference index of the 3D map point descriptor and residual data of the 3D map point descriptor, and a bitstream of the 3D map point spatial location includes a reference index of the 3D map point spatial location and residual data of the 3D map point spatial location.

It should be understood that, in the encoded bitstream of the 3D map in this embodiment of this application, content included in the bitstream of the 3D map varies according to different compression/decompression processes performed on data of the 3D map. For example, if the compression/decompression process includes quantization/dequantization, the bitstream of the 3D map includes quantized data; if the compression/decompression process includes quantization/dequantization and prediction, the bitstream of the 3D map includes a reference index and residual data; or if the compression/decompression process includes prediction, the bitstream of the 3D map includes a reference index and residual data. Therefore, the structure of the encoded bitstream of the 3D map is not specifically limited in this embodiment of this application.

In an implementation process, the steps in the foregoing method embodiments may be completed by an integrated logic circuit in a form of hardware or instructions in a form of software in the processor. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like. The steps of the methods disclosed in embodiments of this application may be directly presented as being performed and completed by a hardware encoding processor, or performed and completed by a combination of hardware and a software module in an encoding processor. The software module may be located in a mature storage medium in the art, such as a random access memory, a flash memory, a read-only memory, a programmable read-only memory, an electrically erasable programmable memory, or a register. The storage medium is located in the memory. The processor reads information in the memory and completes the steps of the foregoing methods in combination with hardware of the processor.

The memory mentioned in the foregoing embodiments may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external buffer. Through examples but not limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the system and methods described in this specification includes but is not limited to these and any memory of another proper type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected depending on actual requirements to achieve the solutions in the embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, technical solutions of this application essentially, or a part contributing to the conventional technology, or some of technical solutions may be implemented in a form of a software product. The computer software product is stored in a storage medium, and includes several instructions for instructing a computer device (a personal computer, a server, a network device, or the like) to perform all or some of the steps of the methods described in embodiments of this application. The storage medium includes any medium that can store program code, for example, a USB flash drive, a removable hard disk, a read-only memory (ROM), a random access memory (RAM), a magnetic disk, or an optical disc.

The foregoing descriptions are merely exemplary implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A codec system for a three-dimensional (3D) map, comprising:

an encoding apparatus; and a decoding apparatus, wherein the encoding apparatus is communicatively connected to the decoding apparatus;

wherein the encoding apparatus is configured to:

compress data of the 3D map to obtain a bitstream of the 3D map; and send the bitstream of the 3D map to the decoding apparatus, wherein the 3D map comprises a plurality of 3D map points, and the data of the 3D map comprises data of the plurality of 3D map points, wherein data of any one of the plurality of 3D map points comprises a 3D map point descriptor and a 3D map point spatial location, wherein the 3D map point descriptor is a vector used to represent a local feature of the corresponding 3D map point, and wherein the bitstream of the 3D map comprises a bitstream of the plurality of 3D map point descriptors and a bitstream of the plurality of 3D map point spatial locations; and wherein the decoding apparatus is configured to:

receive the bitstream of the 3D map; and decompress the bitstream of the 3D map to obtain reconstructed data of the 3D map, wherein the reconstructed data of the 3D map comprises reconstructed data of the plurality of 3D map point descriptors and reconstructed data of the plurality of 3D map point spatial locations.

2. The system according to claim 1, wherein the encoding apparatus is a cloud server, and the decoding apparatus is an electronic device; or the encoding apparatus is a first electronic device, and the decoding apparatus is a second electronic device;

wherein the decoding apparatus is further configured to send a 3D map download request to the encoding apparatus, wherein the 3D map download request comprises location indication information; and wherein the encoding apparatus is further configured to receive the 3D map download request, and send, to the decoding apparatus according to the 3D map download request, a bitstream that is of the 3D map and that corresponds to the location indication information.

3. The system according to claim 1, wherein the encoding apparatus is an electronic device, and the decoding apparatus is a cloud server; and wherein the encoding apparatus is configured to, after the 3D map is created, send the bitstream of the 3D map to the decoding apparatus.

4. The system according to claim 1, wherein the data of the 3D map further comprises a plurality of area descriptors, and any one of the plurality of area descriptors describes features of a part or all 3D map points of the plurality of 3D map points.

5. The system according to claim 1, wherein the encoding apparatus is further configured to create the 3D map.

6. The system according to claim 1, wherein the decoding apparatus is further configured to perform positioning based on the 3D map.

7. A method for decoding a three-dimensional (3D) map, applied to an apparatus that comprises at least one processor, comprising:

receiving, by the at least one processor, a bitstream of the 3D map, wherein the 3D map comprises a plurality of 3D map points, and wherein the bitstream of the 3D map comprises a bitstream of a plurality of 3D map point descriptors and a bitstream of a plurality of 3D map point spatial locations, each 3D map point of the plurality of 3D map points corresponds to a 3D map point descriptor of the plurality of 3D map point descriptors and a 3D map point spatial location of the plurality of 3D map point spatial locations; and decompressing, by the at least one processor, the bitstream of the 3D map to obtain reconstructed data of the 3D map, wherein the reconstructed data of the 3D map comprises reconstructed data of the plurality of 3D map points, wherein reconstructed data of any one of the plurality of 3D map points comprises reconstructed data of a corresponding 3D map point descriptor and reconstructed data of a corresponding 3D map point spatial location, and wherein the 3D map point descriptor is a vector used to represent a local feature of the corresponding 3D map point.

8. The method according to claim 7, wherein the reconstructed data of the 3D map further comprises reconstructed data of a plurality of area descriptors, and any one of the plurality of area descriptors describes features of a part of or all 3D map points of the plurality of 3D map points.

9. The method according to claim 7, further comprising:

sending, by the at least one processor, a 3D map download request, wherein the 3D map download request comprises location indication information; and the receiving, by the at least one processor, the bitstream of the 3D map comprises:

receiving, by the at least one processor, a bitstream that is of the 3D map and that corresponds to the location indication information.

10. The method according to claim 7, wherein the receiving, by the at least one processor, the bitstream of the 3D map comprises:

receiving, by the at least one processor, the bitstream of the 3D map created by an electronic device.

11. The method according to claim 7, wherein the decompressing, by the at least one processor, the bitstream of the 3D map to obtain the reconstructed data of the 3D map comprises:

processing, by the at least one processor, the bitstream of the 3D map to obtain first data; and performing, by the at least one processor, prediction on residual data of second data to obtain the second data, and/or performing, by the at least one processor, dequantization on third data to obtain dequantized data of the third data, wherein the first data is the residual data of the second data or the third data, the second data is the reconstructed data of the 3D map or the third data, and the dequantized data of the third data is the reconstructed data of the 3D map.

12. An apparatus for decoding a three-dimensional (3D) map, comprising:

at least one processor; and one or more memories coupled to the at least one processor and storing programming instructions for execution by the at least one processor to cause the apparatus to:

receive a bitstream of the 3D map, wherein the 3D map comprises a plurality of 3D map points, and wherein the bitstream of the 3D map comprises a bitstream of a plurality of 3D map point descriptors and a bitstream of a plurality of 3D map point spatial locations, each 3D map point of the plurality of 3D map points corresponds to a 3D map point descriptor of the plurality of 3D map point descriptors and a 3D map point spatial location of the plurality of 3D map point spatial locations; and decompress the bitstream of the 3D map to obtain reconstructed data of the 3D map, wherein the reconstructed data of the 3D map comprises reconstructed data of the plurality of 3D map points, wherein reconstructed data of any one of the plurality of 3D map points comprises reconstructed data of a corresponding 3D map point descriptor and reconstructed data of a corresponding 3D map point spatial location, and wherein the 3D map point descriptor is a vector used to represent a local feature of the corresponding 3D map point.

13. The apparatus according to claim 12, wherein the reconstructed data of the 3D map further comprises reconstructed data of a plurality of area descriptors, and any one of the plurality of area descriptors describes features of a part of or all 3D map points of the plurality of 3D map points.

14. The apparatus according to claim 12, wherein the at least one processor further executes the instructions to:

send a 3D map download request, wherein the 3D map download request comprises location indication information; and receive a bitstream that is of the 3D map and that corresponds to the location indication information.

15. A non-transitory computer-readable storage medium, comprising computer instructions, wherein when the computer instructions are executed on a computer, the computer is caused to perform:

receiving a bitstream of a three-dimensional (3D) map, wherein the 3D map comprises a plurality of 3D map points, and wherein the bitstream of the 3D map comprises a bitstream of a plurality of 3D map point descriptors and a bitstream of a plurality of 3D map point spatial locations, each 3D map point of the plurality of 3D map points corresponds to a 3D map point descriptor of the plurality of 3D map point descriptors and a 3D map point spatial location of the plurality of 3D map point spatial locations; and decompressing the bitstream of the 3D map to obtain reconstructed data of the 3D map, wherein the reconstructed data of the 3D map comprises reconstructed data of the plurality of 3D map points, wherein reconstructed data of any one of the plurality of 3D map points comprises reconstructed data of a corresponding 3D map point descriptor and reconstructed data of a corresponding 3D map point spatial location, and wherein the 3D map point descriptor is a vector used to represent a local feature of the corresponding 3D map point.

16. A non-transitory computer-readable storage medium, comprising an encoded bitstream of a three-dimensional (3D) map, wherein the encoded bitstream of the 3D map comprises a bitstream of a plurality of 3D map points, and the 3D map comprises the plurality of 3D map points, wherein the bitstream of the 3D map comprises a bitstream of a plurality of 3D map point descriptors and a bitstream of a plurality of 3D map point spatial locations, each 3D map point of the plurality of 3D map points corresponds to a 3D map point descriptor of the plurality of 3D map point descriptors and a 3D map point spatial location of the plurality of 3D map point spatial locations, and wherein the 3D map point descriptor is a vector used to represent a local feature of the corresponding 3D map point.

17. The non-transitory computer-readable storage medium according to claim 16, wherein the encoded bitstream of the 3D map further comprises a bitstream of a plurality of area descriptors, and any one of the plurality of area descriptors corresponds to at least one 3D map point of the plurality of 3D map points.

18. The non-transitory computer-readable storage medium according to claim 16, wherein a bitstream of any one of the plurality of 3D map points comprises residual data of the 3D map point.

19. The non-transitory computer-readable storage medium according to claim 16, wherein the bitstream of the 3D map point descriptor comprises residual data of the 3D map point descriptor; and/or the bitstream of the 3D map point spatial location comprises residual data of the 3D map point spatial location.

20. The non-transitory computer-readable storage medium according to claim 18, wherein the bitstream of any one of the plurality of 3D map points further comprises indication information of a reference 3D map point, the plurality of 3D map points comprise the reference 3D map point, and the reference 3D map point is a 3D map point that has been encoded before the 3D map point is encoded.

21. The non-transitory computer-readable storage medium according to claim 16, wherein a bitstream of any one of the plurality of 3D map points comprises quantized data of the 3D map point.

22. The non-transitory computer-readable storage medium according to claim 15, wherein the reconstructed data of the 3D map further comprises reconstructed data of a plurality of area descriptors, and any one of the plurality of area descriptors describes features of a part of or all 3D map points of the plurality of 3D map points.

23. The non-transitory computer-readable storage medium according to claim 15, wherein the computer further executes the instructions to:

send a 3D map download request, wherein the 3D map download request comprises location indication information; and receive a bitstream that is of the 3D map and that corresponds to the location indication information.

24. The non-transitory computer-readable storage medium according to claim 15, wherein the computer further executes the instructions to:

receive the bitstream of the 3D map created by an electronic device.

25. The non-transitory computer-readable storage medium according to claim 15, wherein the computer further executes the instructions to:

process the bitstream of the 3D map to obtain first data; and perform prediction on residual data of second data to obtain the second data, and/or performing, by the at least one processor, dequantization on third data to obtain dequantized data of the third data, wherein the first data is the residual data of the second data or the third data, the second data is the reconstructed data of the 3D map or the third data, and the dequantized data of the third data is the reconstructed data of the 3D map.

* * * * *